US012795313B2

(12) United States Patent
Kordon et al.

(10) Patent No.: US 12,795,313 B2
(45) **Date of Patent: *Nov. 10, 2026**

(54) METHODS, APPARATUS AND SYSTEMS FOR DECOMPRESSING A HIGHER ORDER AMBISONICS (HOA) SIGNAL

(71) Applicant: Dolby Laboratories Licensing Corporation, San Francisco, CA (US)

(72) Inventors: Sven Kordon, Wunstorf (DE); Alexander Krueger, Burgdorf (DE); Oliver Wuebbolt, Hannover (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/792,869

(22) Filed: Aug. 2, 2024

(65) Prior Publication Data

US 2025/0080934 A1 Mar. 6, 2025

Related U.S. Application Data

(60) Continuation of application No. 18/339,368, filed on Jun. 22, 2023, now Pat. No. 12,069,465, which is a (Continued)

(30) Foreign Application Priority Data

Mar. 21, 2014 (EP) .................................... 14305411

(51) Int. Cl.

*H04S 3/00* (2006.01)
*G10L 19/008* (2013.01)

(Continued)

(52) U.S. Cl.

CPC ............ *H04S 3/008* (2013.01); *G10L 19/008* (2013.01); *G10L 19/24* (2013.01); *H04S 7/30* (2013.01);

(Continued)

(58) Field of Classification Search

None

See application file for complete search history.

(56) References Cited

U.S. PATENT DOCUMENTS

| | | | |
|---|---|---|---|
| 9,818,413 B2 | 11/2017 | Kordon | |
| 9,847,087 B2 | 12/2017 | Kim | |

(Continued)

FOREIGN PATENT DOCUMENTS

| | | | |
|---|---|---|---|
| CN | 102547549 A | 7/2012 | |
| CN | 102823277 A | 12/2012 | |

(Continued)

OTHER PUBLICATIONS

Hellerud, E. et al "Spatial Redundancy in Higher Order Ambisonics and its Use for Low Delay Lossless Compression" IEEE International Conference on Acoustics, Speech and Signal Processing Apr. 19-24, 2009, pp. 269-272.

(Continued)

*Primary Examiner* — Qin Zhu

(57) ABSTRACT

A method for compressing a HOA signal being an input HOA representation with input time frames (C(k)) of HOA coefficient sequences comprises spatial HOA encoding of the input time frames and subsequent perceptual encoding and source encoding. Each input time frame is decomposed (802) into a frame of predominant sound signals ($X_{PS}$(k−1)) and a frame of an ambient HOA component ($\tilde{C}_{AMB}$(k−1)). The ambient HOA component ($\tilde{C}_{AMB}$(k−1)) comprises, in a layered mode, first HOA coefficient sequences of the input HOA representation ($c_n$(k−1)) in lower positions and second HOA coefficient sequences ($c_{AMB,n}$(k−1)) in remaining higher positions. The second HOA coefficient sequences are part of an HOA representation of a residual between the input HOA representation and the HOA representation of the predominant sound signals.

3 Claims, 10 Drawing Sheets

Related U.S. Application Data continuation of application No. 17/864,708, filed on Jul. 14, 2022, now Pat. No. 11,722,830, which is a continuation of application No. 17/010,827, filed on Sep. 3, 2020, now Pat. No. 11,395,084, which is a division of application No. 16/716,424, filed on Dec. 16, 2019, now Pat. No. 10,779,104, which is a division of application No. 16/429,575, filed on Jun. 3, 2019, now Pat. No. 10,542,364, which is a division of application No. 15/891,606, filed on Feb. 8, 2018, now Pat. No. 10,334,382, which is a division of application No. 15/127,577, filed as application No. PCT/EP2015/055914 on Mar. 20, 2015, now Pat. No. 9,930,464.

(51) Int. Cl.
*G10L 19/24* (2013.01)
*H04S 7/00* (2006.01)

(52) U.S. Cl.
CPC ....... *H04S 2400/01* (2013.01); *H04S 2420/11* (2013.01)

(56) References Cited

U.S. PATENT DOCUMENTS

| | | | |
|---|---|---|---|
| 9,930,464 | B2 | 3/2018 | Kordon |
| 10,334,382 | B2 | 6/2019 | Kordon |
| 10,388,292 | B2 | 8/2019 | Kordon |
| 10,542,364 | B2 | 1/2020 | Kordon |
| 10,629,212 | B2 | 4/2020 | Kordon |
| 11,146,903 | B2 | 10/2021 | Sen |
| 11,722,830 | B2 | 8/2023 | Kordon |
| 2008/0205676 | A1 | 8/2008 | Merimaa et al. |
| 2012/0155653 | A1 | 6/2012 | Jax et al. |
| 2013/0216070 | A1 | 8/2013 | Keiler |
| 2014/0023196 | A1 | 1/2014 | Xiang |
| 2014/0025386 | A1 | 1/2014 | Xiang |
| 2014/0358565 | A1 | 12/2014 | Peters |
| 2015/0098572 | A1 | 4/2015 | Alexander |
| 2015/0213805 | A1 | 7/2015 | Peters |
| 2015/0243292 | A1 | 8/2015 | Morrell |
| 2015/0332679 | A1 | 11/2015 | Alexander |
| 2016/0088415 | A1 | 3/2016 | Krueger |
| 2016/0104494 | A1 | 4/2016 | Kim |
| 2016/0125890 | A1 | 5/2016 | Jax |

FOREIGN PATENT DOCUMENTS

| | | | | |
|---|---|---|---|---|
| CN | 102013255 | B | 2/2014 | |
| CN | 103649706 | A | 3/2014 | |
| CN | 103650539 | A | 3/2014 | |
| CN | 102934162 | B | 12/2014 | |
| CN | 104428833 | B | 3/2015 | |
| CN | 108140392 | A | 6/2018 | |
| EP | 2450880 | A1 | 5/2012 | |
| EP | 2469741 | A1 * | 6/2012 | ........... G10L 19/008 |
| EP | 2469742 | A2 | 6/2012 | |
| EP | 2637427 | A1 | 9/2013 | |
| EP | 2665208 | A1 | 11/2013 | |
| EP | 2688065 | A1 | 1/2014 | |
| EP | 2743922 | A1 | 6/2014 | |
| EP | 2800401 | A1 | 11/2014 | |
| JP | 2012133366 | A | 7/2012 | |
| JP | 2013545391 | A | 12/2013 | |
| JP | 2014-535231 | A | 12/2014 | |
| JP | 6351748 | B2 | 7/2018 | |
| TW | 201215213 | A | 4/2012 | |
| TW | 201301911 | A | 1/2013 | |
| TW | 201303851 | A | 1/2013 | |
| TW | 201346890 | A | 11/2013 | |
| TW | 201411604 | A | 3/2014 | |
| TW | 201412145 | A | 3/2014 | |
| WO | 2004023457 | A1 | 3/2004 | |
| WO | 2006/016735 | A1 | 2/2006 | |
| WO | 2010017978 | A1 | 2/2010 | |
| WO | 2012/059385 | A1 | 5/2012 | |
| WO | 2013/171083 | A1 | 11/2013 | |
| WO | 2014/012944 | A1 | 1/2014 | |
| WO | 2014/013070 | A1 | 1/2014 | |
| WO | 2014/194075 | A1 | 12/2014 | |
| WO | 2017060410 | A1 | 4/2017 | |
| WO | 2017060411 | A1 | 4/2017 | |

OTHER PUBLICATIONS

ISO/IEC JTC1/SC29/WG11 "WD1-HOA Text of MPEG-H 3D Audio" Jan. 2014, Coding of Moving Pictures and Audio, pp. 1-86.

Moreau, S. et al "3D Sound Field Recording with Higher Order Ambisonics-Objective Measurements and Validation of Spherical Microphone" AES 120th Convention, May 1, 2006, pp.

* cited by examiner

METHODS, APPARATUS AND SYSTEMS FOR DECOMPRESSING A HIGHER ORDER AMBISONICS (HOA) SIGNAL

CROSS REFERENCE TO RELATED APPLICATIONS

This application is a continuation of U.S. application Ser. No. 18/339,368, filed Jun. 22, 2023, which is a continuation of U.S. patent application Ser. No. 17/864,708, filed Jul. 14, 2022, now U.S. Pat. No. 11,722,830, issued on Aug. 8, 2023, which is a continuation of U.S. patent application Ser. No. 17/010,827, filed Sep. 3, 2020, now U.S. Pat. No. 11,395,084, issued on Jul. 19, 2022, which is a division of U.S. patent application Ser. No. 16/716,424, filed Dec. 16, 2019, now U.S. Pat. No. 10,779,104, issued on Sep. 15, 2020, which is a division of U.S. patent application Ser. No. 16/429,575, filed Jun. 3, 2019, now U.S. Pat. No. 10,542,364, issued on Jan. 21, 2020, which is a division of U.S. patent application Ser. No. 15/891,606, filed Feb. 8, 2018, now U.S. Pat. No. 10,334,382, issued on Jun. 25, 2019, which is division of U.S. patent application Ser. No. 15/127,577, filed Sep. 20, 2016, now U.S. Pat. No. 9,930,464, issued on Mar. 27, 2018, which is a U.S. national stage of PCT/EP2015/055914, filed Mar. 20, 2015, which claims priority to European Patent Application No. 14305411.2, filed Mar. 21, 2014, each of which is incorporated by reference in its entirety.

FIELD OF THE INVENTION

This invention relates to a method for compressing a Higher Order Ambisonics (HOA) signal, a method for decompressing a compressed HOA signal, an apparatus for compressing a HOA signal, and an apparatus for decompressing a compressed HOA signal.

BACKGROUND

Higher Order Ambisonics (HOA) offers a possibility to represent three-dimensional sound. Other known techniques are wave field synthesis (WFS) or channel based approaches like 22.2. In contrast to channel based methods, however, the HOA representation offers the advantage of being independent of a specific loudspeaker set-up. This flexibility, however, is at the expense of a decoding process which is required for the playback of the HOA representation on a particular loudspeaker set-up. Compared to the WFS approach, where the number of required loudspeakers is usually very large, HOA may also be rendered to set-ups consisting of only few loudspeakers. A further advantage of HOA is that the same representation can also be employed without any modification for binaural rendering to headphones.

HOA is based on the representation of the so-called spatial density of complex harmonic plane wave amplitudes by a truncated Spherical Harmonics (SH) expansion. Each expansion coefficient is a function of angular frequency, which can be equivalently represented by a time domain function. Hence, without loss of generality, the complete HOA sound field representation actually can be assumed to consist of O time domain functions, where O denotes the number of expansion coefficients. These time domain functions will be equivalently referred to as HOA coefficient sequences or as HOA channels in the following. Usually, a spherical coordinate system is used where the x axis points to the frontal position, the y axis points to the left, and the z axis points to the top. A position in space $x=(r,\theta,\phi)^T$ is represented by a radius $r>0$ (i.e. the distance to the coordinate origin), an inclination angle $\theta\in[0, \pi]$ measured from the polar axis z and an azimuth angle $\phi\in[0,2\pi[$ measured counter-clockwise in the x-y plane from the x axis. Further, $(\cdot)^T$ denotes the transposition.

A more detailed description of the HOA coding is provided in the following.

The Fourier transform of the sound pressure with respect to time denoted by $$\mathcal{F}_t(\cdot),\text{ i.e., } P(\omega, x) = \mathcal{F}_t(p(t, x)) = \int_{-\infty}^{\infty} p(t, x)e^{-i\omega t}dt$$

with ω denoting the angular frequency and i indicating the imaginary unit, may be expanded into the series of Spherical Harmonics according to $$P(\omega = kc_s, r, \theta, \phi) = \sum_{n=0}^{N}\sum_{m=-n}^{n} A_n^m(k) j_n(kr) S_n^m(\theta, \phi).$$

Here $c_s$ denotes the speed of sound and k denotes the angular wavenumber, which is related to the angular frequency ω by $$k = \frac{\omega}{c_s}.$$

Further, $j_n(\cdot)$ denote the spherical Bessel functions of the first kind and $$S_n^m(\theta, \phi)$$

denote the real valued Spherical Harmonics of order n and degree m. The expansion coefficients $$A_n^m(k)$$

only depend on the angular wavenumber k. Note that it has been implicitly assumed that sound pressure is spatially band-limited. Thus, the series is truncated with respect to the order index n at an upper limit N, which is called the order of the HOA representation. If the sound field is represented by a superposition of an infinite number of harmonic plane waves of different angular frequencies ω and arriving from all possible directions specified by the angle tuple (θ,ϕ), the respective plane wave complex amplitude function C(ω,θ,ϕ) can be expressed by the following Spherical Harmonics expansion:

$$C(\omega = kc_s, \theta, \phi) = \sum_{n=0}^{N}\sum_{m=-n}^{n} C_n^m(k) S_n^m(\theta, \phi),$$

where the expansion coefficients $$C_n^m(k)$$

are related to the expansion coefficients $$A_n^m(k)$$

by $$A_n^m(k) = i^n C_n^m(k).$$

Assuming the individual coefficients $$C_n^m(\omega = kc_s)$$

to be functions of the angular frequency ω, the application of the inverse Fourier transform (denoted by $\mathcal{F}^{-1}(\bullet)$) provides time domain functions $$c_n^m(t) = \mathcal{F}_t^{-1}(C_n^m(\omega/c_s)) = \frac{1}{2\pi}\int_{-\infty}^{\infty} C_n^m\left(\frac{\omega}{c_s}\right)e^{i\omega t}d\omega$$

for each order n and degree m, which can be collected in a single vector c(t) by $$c(t) = [c_0^0(t) \quad c_1^{-1}(t) \quad c_1^0(t) \quad c_1^1(t) \quad c_2^{-2}(t) \quad c_2^{-1}(t)\ c_2^0(t) \quad \ldots \quad c_N^{N-1}(t) \quad c_N^N(t)]^T.$$

The position index of a time domain function $$c_n^m(t)$$

within the vector c(t) is given by n(n+1)+1+m. The overall number of elements in the vector c(t) is given by $O=(N+1)^2$. The discrete-time versions of the functions $$c_n^m(t)$$

are referred to as Ambisonic coefficient sequences. A frame-based HOA representation is obtained by dividing all of these sequences into frames C(k) of length B and frame index k as follows:

$$C(k) := [c((kB+1)T_s) \quad c((kB+2)T_s) \ldots c((kB+B)T_s) \quad ],$$

where $T_s$ denotes the sampling period. The frame C(k) itself can then be represented as a composition of its individual rows $c_i(k)$,i=1, . . . , O, as $$C(k) = \begin{bmatrix} c_1(k) \\ c_2(k) \\ \vdots \\ c_O(k) \end{bmatrix}$$

with $c_i(k)$ denoting the frame of the Ambisonic coefficient sequence with position index i.

The spatial resolution of the HOA representation improves with a growing maximum order N of the expansion. Unfortunately, the number of expansion coefficients O grows quadratically with the order N, in particular $O=(N+1)^2$. For example, typical HOA representations using order N=4 require O=25 HOA (expansion) coefficients. According to these considerations, the total bit rate for the transmission of HOA representation, given a desired single-channel sampling rate $f_s$ and the number of bits $N_b$ per sample, is determined by $O \cdot f_s \cdot N_b$. Consequently, transmitting a HOA representation of order N=4 with a sampling rate of $f_s$=48 kHz employing $N_b$=16 bits per sample results in a bit rate of 19.2 M Bits/s, which is very high for many practical applications, as e.g. streaming. Thus, compression of HOA representations is highly desirable.

Previously, the compression of HOA sound field representations was proposed in the European Patent applications EP2743922A, EP2665208A and EP2800401A. These approaches have in common that they perform a sound field analysis and decompose the given HOA representation into a directional and a residual ambient component.

The final compressed representation is assumed to comprise, on the one hand, a number of quantized signals, which result from the perceptual coding of the directional signals, and relevant coefficient sequences of the ambient HOA component. On the other hand, it is assumed to comprise additional side information related to the quantized signals, which is necessary for the reconstruction of the HOA representation from its compressed version.

Further, a similar method is described in ISO/IEC JTC1/SC29/WG11 N14264 (Working draft 1-HOA text of MPEG-H 3D audio, January 2014, San Jose), where the directional component is extended to a so-called predominant sound component. As the directional component, the predominant sound component is assumed to be partly represented by directional signals, i.e. monaural signals with a corresponding direction from which they are assumed to impinge on the listener, together with some prediction parameters to predict portions of the original HOA representation from the directional signals. Additionally, the predominant sound component is supposed to be represented by so-called vector based signals, meaning monaural signals with a corresponding vector which defines the directional distribution of the vector based signals. The known compressed HOA representation consists of I quantized monaural signals and some additional side information, wherein a fixed number $O_{MIN}$ out of these I quantized monaural signals represent a spatially transformed version of the first $O_{MIN}$ coefficient sequences of the ambient HOA component $C_{AMB}$(k−2). The type of the remaining $I-O_{MIN}$ signals can vary between successive frames, and be either directional, vector based, empty or representing an additional coefficient sequence of the ambient HOA component $C_{AMB}$(k−2).

A known method for compressing a HOA signal representation with input time frames (C(k)) of HOA coefficient sequences includes spatial HOA encoding of the input time frames and subsequent perceptual encoding and source encoding. The spatial HOA encoding 100, as shown in FIG. 1A, comprises performing Direction and Vector Estimation processing of the HOA signal in a Direction and Vector Estimation block 101, wherein data comprising first tuple sets $\mathcal{M}_{DIR}(k)$ for directional signals and second tuple sets $\mathcal{M}_{VEC}(k)$ for vector based signals are obtained. Each of the first tuple sets comprises an index of a directional signal and a respective quantized direction, and each of the second tuple sets comprising an index of a vector based signal and a vector defining the directional distribution of the signals. A next step is decomposing 103 each input time frame of the HOA coefficient sequences into a frame of a plurality of predominant sound signals $X_{PS}(k-1)$ and a frame of an ambient HOA component $C_{AMB}(k-1)$, wherein the predominant sound signals $X_{PS}(k-1)$ comprise said directional sound signals and said vector based sound signals. The decomposing further provides prediction parameters □ (k−1) and a target assignment vector $v_{A,T}(k-1)$. The prediction parameters □ (k−1) describe how to predict portions of the HOA signal representation from the directional signals within the predominant sound signals $X_{PS}(k-1)$ so as to enrich predominant sound HOA components, and the target assignment vector $v_{A,T}(k-1)$ contains information about how to assign the predominant sound signals to a given number I of channels.

The ambient HOA component $C_{AMB}(k-1)$ is modified 104 according to the information provided by the target assignment vector $v_{A,T}(k-1)$, wherein it is determined which coefficient sequences of the ambient HOA component are to be transmitted in the given number I of channels, depending on how many channels are occupied by predominant sound signals. A modified ambient HOA component $C_{M,A}(k-2)$ and a temporally predicted modified ambient HOA component $C_{P,M,A}(k-1)$ are obtained. Also a final assignment vector $v_A(k-2)$ is obtained from information in the target assignment vector $v_{A,T}(k-1)$. The predominant sound signals $X_{PS}(k-1)$ obtained from the decomposing, and the determined coefficient sequences of the modified ambient HOA component $C_{M,A}(k-2)$ and of the temporally predicted modified ambient HOA component $C_{P,M,A}(k-1)$ are assigned to the given number of channels, using the information provided by the final assignment vector $v_A(k-2)$, wherein transport signals $y_i(k-2)$, i=1, . . . , I and predicted transport signals $y_{P,i}(k-2)$, i=1, . . . , I are obtained. Then, gain control (or normalization) is performed on the transport signals $y_i(k-2)$ and the predicted transport signals $y_{P,i}(k-2)$, wherein gain modified transport signals $z_i(k-2)$, exponents $e_i(k-2)$ and exception flags ($\beta_i(k-2)$ are obtained.

As shown in FIG. 1B, the perceptual encoding and source encoding comprises perceptual coding of the gain modified transport signals $z_i(k-2)$, wherein perceptually encoded transport signals $\check{z}_i(k-2)$, i=1, . . . , I are obtained, encoding side information comprising said exponents $e_i(k-2)$ and exception flags $\beta_i(k-2)$, the first and second tuple sets $\mathcal{M}_{DIR}(k)$, $\mathcal{M}_{VEC}(k)$, the prediction parameters □ (k−1) and the final assignment vector $v_A(k-2)$, and encoded side information $\check{\Gamma}(k-2)$ is obtained. Finally, the perceptually encoded transport signals $\check{z}_i(k-2)$ and the encoded side information are multiplexed into a bitstream.

SUMMARY OF THE INVENTION

One drawback of the proposed HOA compression method is that it provides a monolithic (i.e. non-scalable) compressed HOA representation. For certain applications, like broadcasting or internet streaming, it is however desirable to be able to split the compressed representation into a low quality base layer (BL) and a high quality enhancement layer (EL). The base layer is supposed to provide a low quality compressed version of the HOA representation, which can be decoded independently of the enhancement layer. Such a BL should typically be highly robust against transmission errors, and be transmitted at a low data rate in order to guarantee a certain minimum quality of the decompressed HOA representation even under bad transmission conditions. The EL contains additional information to improve the quality of the decompressed HOA representation.

The present invention provides a solution for modifying existing HOA compression methods so as to be able to provide a compressed representation that comprises a (low quality) base layer and a (high quality) enhancement layer. Further, the present invention provides a solution for modifying existing HOA decompression methods so as to be able to decode a compressed representation that comprises at least a low quality base layer that is compressed according to the invention.

One improvement relates to obtaining a self-contained (low quality) base layer. According to the invention, the $O_{MIN}$ channels that are supposed to contain a spatially transformed version of the (without loss of generality) first $O_{MIN}$ coefficient sequences of the ambient HOA component $C_{AMB}(k-2)$ are used as the base layer. An advantage of selecting the first $O_{MIN}$ channels for forming a base layer is their time-invariant type. However, conventionally the respective signals lack any predominant sound components, which are essential for the sound scene. This is also clear from the conventional computation of the ambient HOA component $C_{AMB}(k-1)$, which is carried out by subtraction of the predominant sound HOA representation $C_{PS}(k-1)$ from the original HOA representation $C(k-1)$ according to $$C_{AMB}(k-1) = C(k-1) - C_{PS}(k-1) \tag{1}$$

Therefore, one improvement of the invention relates to the addition of such predominant sound components. According to the invention, a solution to this problem is the inclusion of predominant sound components at a low spatial resolution into the base layer. For this purpose, the ambient HOA component $C_{AMB}(k-1)$ that is output by a HOA Decomposition processing in the spatial HOA encoder according to the invention is replaced by a modified version thereof. The modified ambient HOA component comprises in the first $O_{MIN}$ coefficient sequences, which are supposed to be always transmitted in a spatially transformed form, the coefficient sequences of the original HOA component. This improvement of the HOA Decomposition processing can be seen as an initial operation for making the HOA compression work in a layered mode (for example dual layer mode). This mode provides e.g. two bit streams, or a single bit stream that can be split up into a base layer and an enhancement layer. Using or not using this mode is signalized by a mode indication bit (e.g. a single bit) in access units of the total bit stream.

In one embodiment, the base layer bit stream $\check{B}_{BASE}(k-2)$ only includes the perceptually encoded signals $\check{Z}_i(k-2)$, i=1, . . . , $O_{MIN}$, and the corresponding coded gain control side information, which consists of the exponents $e_i(k-2)$ and the exception flags $\beta_i(k-2)$, i=1, . . . , $O_{MIN}$. The remaining perceptually encoded signals $\check{Z}_i(k-2)$, i=$O_{MIN}$+1, . . . , O and the encoded remaining side information are included into the enhancement layer bit stream. In one embodiment, the base layer bit stream $\check{B}_{BASE}(k-2)$ and the enhancement layer bit stream $\check{B}_{ENH}(k-2)$ are then jointly transmitted instead of the former total bit stream $\check{B}(k-2)$.

In one embodiment, the present invention is directed to a method of decoding a compressed HOA representation of a sound or a soundfield. The method may include receiving a bit stream containing the compressed HOA representation. The method may further include determining whether there are multiple layers relating to the compressed HOA representation. It may further include decoding, based on a determination that there are multiple layers, the compressed HOA representation from the bitstream to obtain a sequence of decoded HOA representations. A first subset of the sequence of decoded HOA representations may correspond to a first set of indices and a second subset of the sequence of decoded HOA representations may correspond to a second set of indices. The first set of indices may be based on $O_{MIN}$ channels. For each index in the first set of indices, a corresponding decoded HOA representation in the first subset is determined based on only a corresponding ambient HOA component. The second set of indices may be determined based on at least one of the multiple layers.

In another embodiment, an apparatus for decoding a compressed HOA representation of a sound or a soundfield, may comprise a receiver for receiving a bit stream containing the compressed HOA representation. The apparatus may further comprise an audio decoder for decoding, based on a determination that there are multiple layers, the compressed HOA representation from the bitstream to obtain a sequence of decoded HOA representations. As above, a first subset of the sequence of decoded HOA representations may correspond to a first set of indices and a second subset of the sequence of decoded HOA representations may correspond to a second set of indices. The first set of indices may be based on $O_{MIN}$ channels. For each index in the first set of indices, a corresponding decoded HOA representation in the first subset may be determined based on only a corresponding ambient HOA component. The second set of indices may be determined based on at least one of the multiple layers.

Advantageous embodiments of the invention are disclosed in the dependent claims, the following description and the figures.

BRIEF DESCRIPTION OF THE DRAWINGS

Exemplary embodiments of the invention are described with reference to the accompanying drawings as follows.

DETAILED DESCRIPTION OF THE INVENTION

For easier understanding, prior art solutions in FIGS. 1A, 1B and FIGS. 2A and 2B are recapitulated in the following.

Figure 1A:
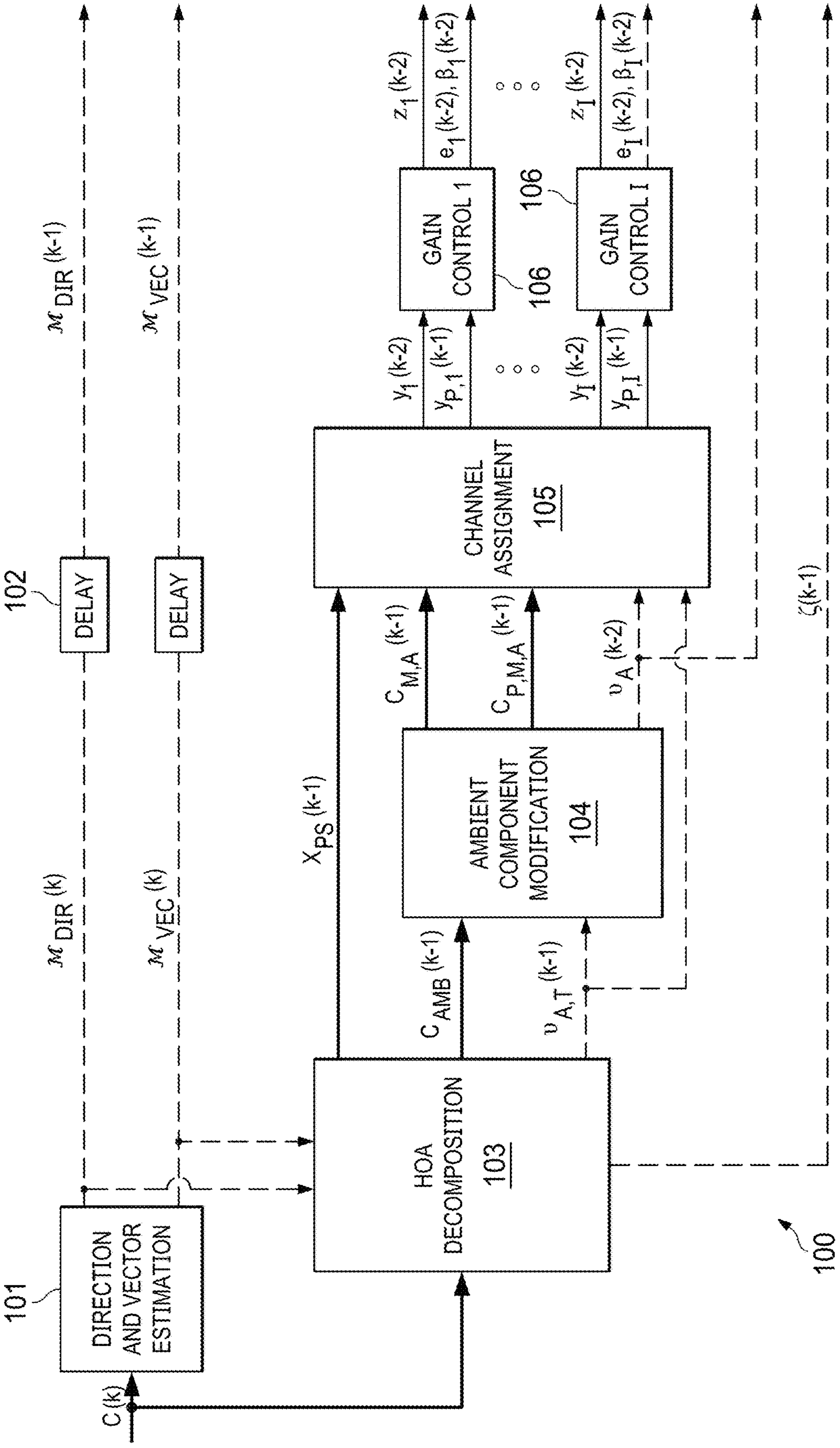
FIGS. 1A and 1B illustrate an exemplary structure of a conventional architecture of a HOA compressor.
Figure 1B:
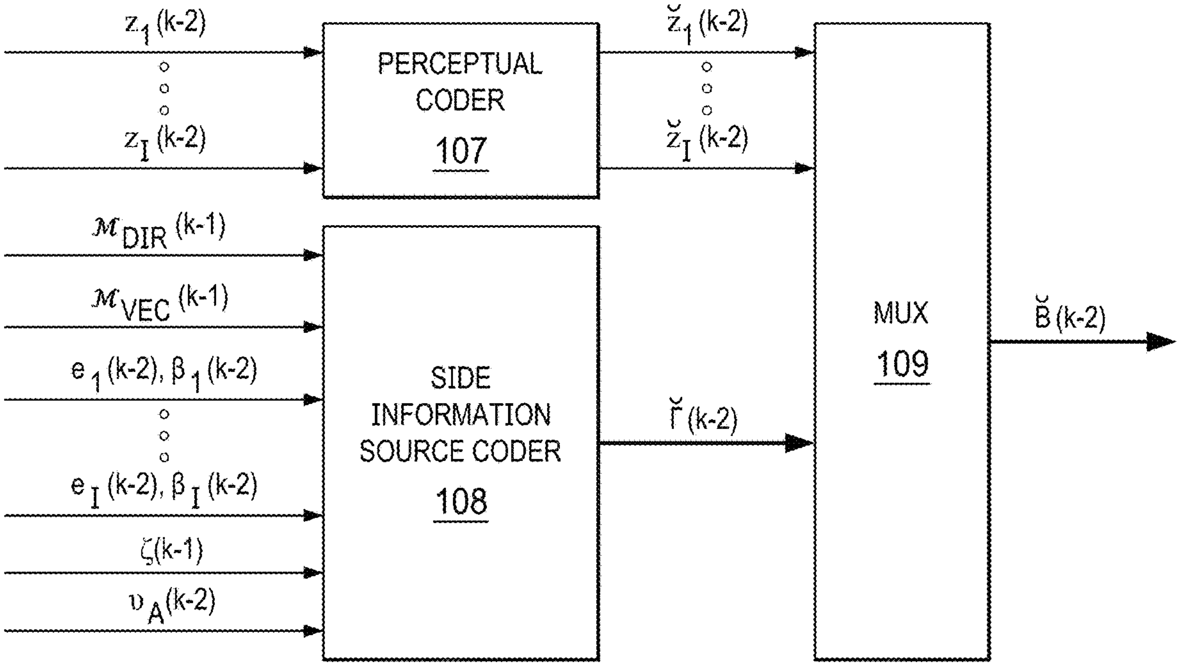
FIG. 1B (PRIOR ART)

FIGS. 1A and 1B show the structure of a conventional architecture of a HOA compressor. In a method described in [4], the directional component is extended to a so-called predominant sound component. As the directional component, the predominant sound component is assumed to be partly represented by directional signals, meaning monaural signals with a corresponding direction from which they are assumed to impinge on the listener, together with some prediction parameters to predict portions of the original HOA representation from the directional signals. Additionally, the predominant sound component is supposed to be represented by so-called vector based signals, meaning monaural signals with a corresponding vector which defines the directional distribution of the vector based signals. The overall architecture of the HOA compressor proposed in [4] is illustrated in FIG. 1A and B. It can be subdivided into a spatial HOA encoding part depicted in FIG. 1A and a perceptual and source encoding part depicted in FIG. 1B. The spatial HOA encoder provides a first compressed HOA representation consisting of I signals together with side information describing how to create an HOA representation thereof. In the perceptual and side info source coder the mentioned I signals are perceptually encoded and the side information is subjected to source encoding, before multiplexing the two coded representations.

Conventionally, the spatial encoding works as follows.

In a first step, the k-th frame C(k) of the original HOA representation is input to a Direction and Vector Estimation processing block, which provides the tuple sets $\mathcal{M}_{DIR}(k)$ and $\mathcal{M}_{VEC}(k)$. The tuple set $\mathcal{M}_{DIR}(k)$ consists of tuples of which the first element denotes the index of a directional signal and of which the second element denotes the respective quantized direction. The tuple set $\mathcal{M}_{VEC}(k)$ consists of tuples of which the first clement indicates the index of a vector based signal and of which the second element denotes the vector defining the directional distribution of the signals, i.e.. how the HOA representation of the vector based signal is computed.

Using both tuple sets $\mathcal{M}_{DIR}(k)$ and $\mathcal{M}_{VEC}(k)$, the initial HOA frame C(k) is decomposed in the HOA Decomposition into the frame $X_{PS}(k-1)$ of all predominant sound (i.e. directional and vector based) signals and the frame $C_{AMB}(k-1)$ of the ambient HOA component. Note the delay 102 of one frame, respectively, which is due to overlap add processing in order to avoid blocking artifacts. Furthermore, the HOA Decomposition is assumed to output some prediction parameters $\zeta(k-1)$ describing how to predict portions of the original HOA representation from the directional signals in order to enrich the predominant sound HOA component. Additionally, a target assignment vector $v_{A,T}(k-1)$ containing information about the assignment of predominant sound signals, which were determined in the HOA Decomposition processing block, to the I available channels is provided. The affected channels can be assumed to be occupied, meaning they are not available to transport any coefficient sequences of the ambient HOA component in the respective time frame.

In the Ambient Component Modification processing block, the frame $C_{AMB}(k-1)$ of the ambient HOA component is modified according to the information provided by the tagret assignment vector $v_{A,T}(k-1)$. In particular, it is determined which coefficient sequences of the ambient HOA component are to be transmitted in the given I channels, depending, amongst other aspects, on the information (contained in the target assignment vector $v_{A,T}(k-1)$) about which channels are available and not already occupied by predominant sound signals. Additionally, a fade in and out of coefficient sequences is performed if the indices of the chosen coefficient sequences vary between successive frames.

Furthermore, it is assumed that the first $O_{MIN}$ coefficient sequences of the ambient HOA component $C_{AMB}(k-2)$ are always chosen to be perceptually coded and to be transmitted, where $O_{MIN}=(N_{MIN}+1)^2$ with $N_{MIN}\leq N$ being typically a smaller order than that of the original HOA representation. In order to de-correlate these HOA coefficient sequences, it is proposed to transform them to directional signals (i.e. general plane wave functions) impinging from some predefined directions $\Omega_{MIN,d}$, d=1, . . . , $O_{MIN}$.

Along with the modified ambient HOA component $C_{M,A}(k-1)$, a temporally predicted modified ambient HOA component $C_{P,M,A}(k-1)$ is computed to be later used in the Gain Control processing block in order to allow a reasonable look ahead.

The information about the modification of the ambient HOA component is directly related to the assignment of all possible types of signals to the available channels. The final information about the assignment is contained in the final assignment vector $v_A(k-2)$. In order to compute this vector, information contained in the target assignment vector $v_{A,T}(k-1)$ is exploited.

The Channel Assignment assigns with the information provided by the assignment vector $v_A(k-2)$ the appropriate signals contained in $X_{PS}(k-2)$ and that contained in $C_{M,A}(k-2)$ to the I available channels, yielding the signals $y_i(k-2)$, i=1, . . . , I. Further, appropriate signals contained in $X_{PS}(k-1)$ and that in $C_{P,AMB}(k-1)$ are also assigned to the I available channels, yielding the predicted signals $y_{P,i}(k-2)$, i=1, . . . , I. Each of the signals $y_i(k-2)$, i=1, . . . , I, is finally processed by a Gain Control, where the signal gain is smoothly modified to achieve a value range that is suitable for the perceptual encoders. The predicted signal frames $y_{P,i}(k-2)$, i=1, . . . , I, allow a kind of look ahead in order to avoid severe gain changes between successive blocks. The gain modifications are assumed to be reverted in the spatial decoder with the gain control side information, consisting of the exponents $e_i(k-2)$ and the exception flags $\beta_i(k-2)$, i=1, . . . , I.

Figure 2A:
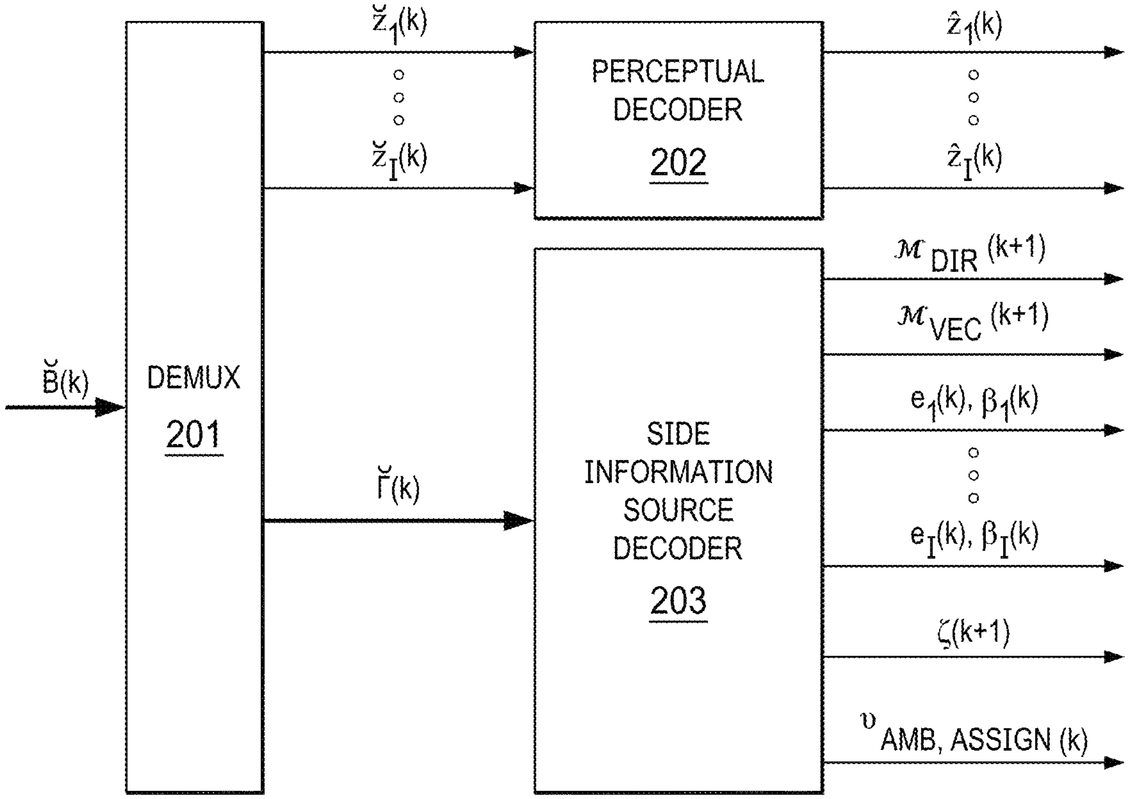
FIGS. 2A and 2B illustrate an exemplary structure of a conventional architecture of a HOA decompressor.
Figure 2B:
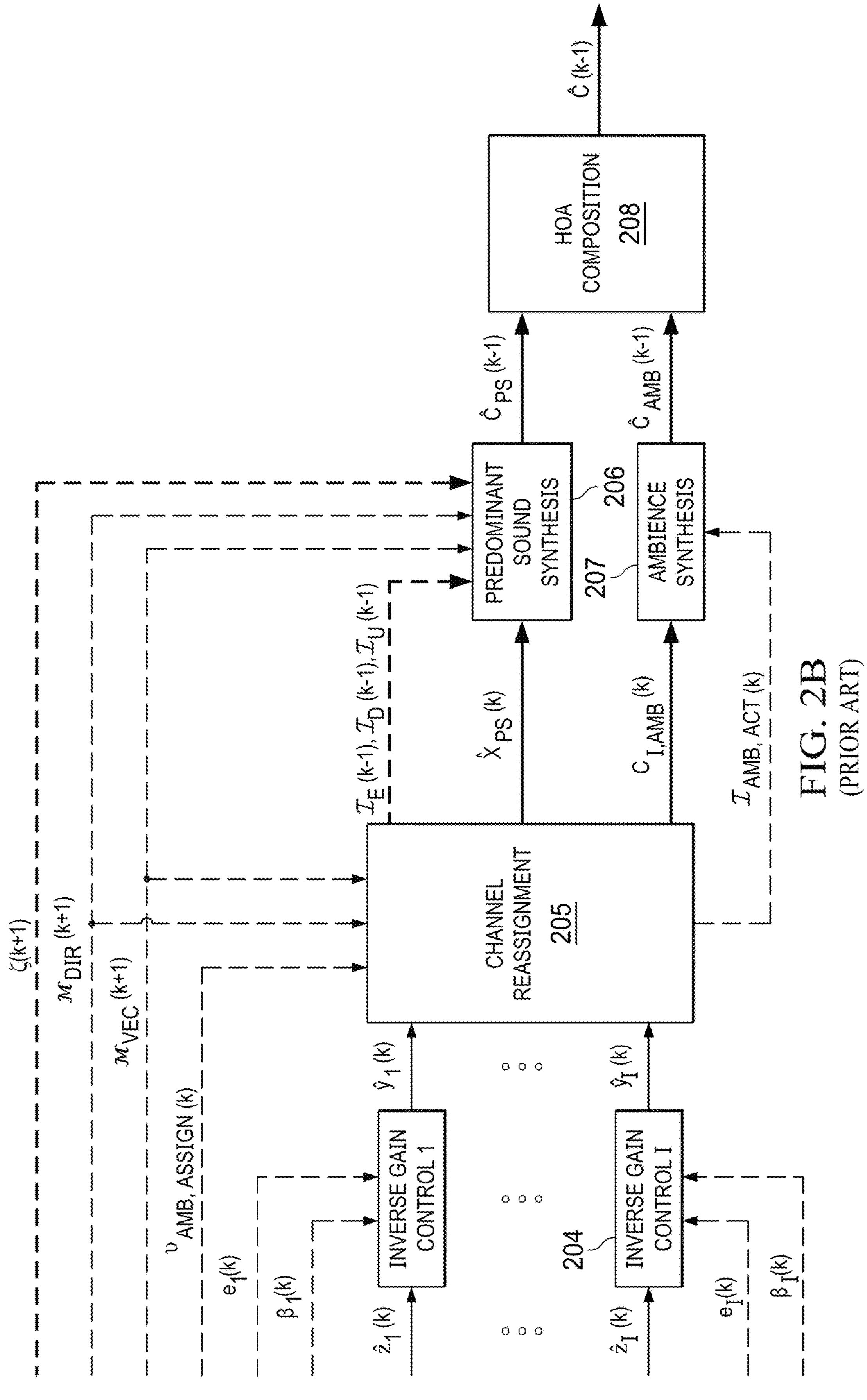
FIG. 2B (PRIOR ART)

FIGS. 2A and 2B show the structure of a conventional architecture of a HOA decompressor, as proposed in [4]. Conventionally, HOA decompression consists of the counterparts of the HOA compressor components, which are obviously arranged in reverse order. It can be subdivided into a perceptual and source decoding part depicted in FIG. 2A and a spatial HOA decoding part depicted in FIG. 2B.

In the perceptual and side info source decoder, the bit stream is first de-multiplexed into the perceptually coded representation of the I signals and into the coded side information describing how to create an HOA representation thereof. Successively, a perceptual decoding of the I signals and a decoding of the side information is performed. Then, the spatial HOA decoder creates from the I signals and the side information the reconstructed HOA representation.

Conventionally, spatial HOA decoding works as follows.

In the spatial HOA decoder, each of the perceptually decoded signals $\hat{z}_i(k)$, i∈{1, . . . , I}, is first input to an Inverse Gain Control processing block together with the associated gain correction exponent $e_i(k)$ and gain correction exception flag $\beta_i(k)$. The i-th Inverse Gain Control processing provides a gain corrected signal frame $\hat{y}_i(k)$.

All of the I gain corrected signal frames $\hat{y}_i(k)$, i∈{1, . . . , I}, are passed together with the assignment vector $v_{AMB,ASSIGN}(k)$ and the tuple sets $\mathcal{M}_{DIR}(k+1)$ and $\mathcal{M}_{VEC}(k+1)$ to the Channel Reassignment. The tuple sets $\mathcal{M}_{DIR}(k+1)$ and $\mathcal{M}_{VEC}(k+1)$ are defined above (for spatial HOA encoding), and the assignment vector $v_{AMB,ASSIGN}(k)$ consists of I components, which indicate for each transmission channel if and which coefficient sequence of the ambient HOA component it contains. In the Channel Reassignment the gain corrected signal frames $\hat{y}_i(k)$ are redistributed to reconstruct the frame $\hat{X}_{PS}(k)$ of all predominant sound signals (i.e., all directional and vector based signals) and the frame $C_{I,AMB}(k)$ of an intermediate representation of the ambient HOA component. Additionally, the set $\mathcal{J}_{AMB,ACT}(k)$ of indices of coefficient sequences of the ambient HOA component, which are active in the k-th frame, and the sets $\mathcal{J}_E(k-1)$, $\mathcal{J}_D(k-1)$, and $\mathcal{J}_U(k-1)$ of coefficient indices of the ambient HOA component, which have to be enabled, disabled and to remain active in the (k−1)-th frame, are provided.

In the Predominant Sound Synthesis the HOA representation of the predominant sound component $\hat{C}_{PS}(k-1)$ is computed from the frame $\hat{X}_{PS}(k)$ of all predominant sound signals using the tuple set $\mathcal{M}_{DIR}(k+1)$ and the set $\zeta(k+1)$ of prediction parameters, the tuple set $\mathcal{M}_{VEC}(k+1)$ and the sets $\mathcal{J}_E(k-1)$, $\mathcal{J}_D(k-1)$, and $\mathcal{J}_U(k-1)$.

In the Ambience Synthesis, the ambient HOA component frame $\hat{C}_{AMB}(k-1)$ is created from the frame $C_{I,AMB}(k)$ of the intermediate representation of the ambient HOA component, using the set $\mathcal{J}_{AMB,ACT}(k)$ of indices of coefficient sequences of the ambient HOA component which are active in the k-th frame. Note the delay of one frame, which is introduced due to the synchronization with the predominant sound HOA component.

Finally, in the HOA Composition the ambient HOA component frame $\hat{C}_{AMB}(k-1)$ and the frame $\hat{C}_{PS}(k-1)$ of the predominant sound HOA component are superposed to provide the decoded HOA frame $\hat{C}(k-1)$.

As has become clear from the coarse description of the HOA compression and decompression method above, the compressed representation consists of I quantized monaural signals and some additional side information. A fixed number $O_{MIN}$ out of these I quantized monaural signals represent a spatially transformed version of the first $O_{MIN}$ coefficient sequences of the ambient HOA component $C_{AMB}(k-2)$. The type of the remaining $I-O_{MIN}$ signals can vary between successive frame, being either directional, vector based, empty or representing an additional coefficient sequence of the ambient HOA component $C_{AMB}(k-2)$. Taken as it is, the compressed HOA representation is meant to be monolithic. In particular, one problem is how to split the described representation into a low quality base layer and an enhancement layer.

According to the disclosed invention, a candidate for a low quality base layer are the $O_{MIN}$ channels that contain a spatially transformed version of the first $O_{MIN}$ coefficient sequences of the ambient HOA component $C_{AMB}(k-2)$. What makes these (without loss of generality: first) $O_{MIN}$ channels a good choice to form a low quality base layer is their time-invariant type. However, the respective signals lack any predominant sound components, which are essential for the sound scene. This can also be seen in the computation of the ambient HOA component $C_{AMB}(k-1)$, which is carried out by subtraction of the predominant sound HOA representation $C_{PS}(k-1)$ from the original HOA representation $C(k-1)$ according to $$C_{AMB}(k-1) = C(k-1) - C_{PS}(k-1) \quad (1)$$

A solution to this problem is to include the predominant sound components at a low spatial resolution into the base layer.

Proposed amendments to the HOA compression are described in the following.

Figure 3:
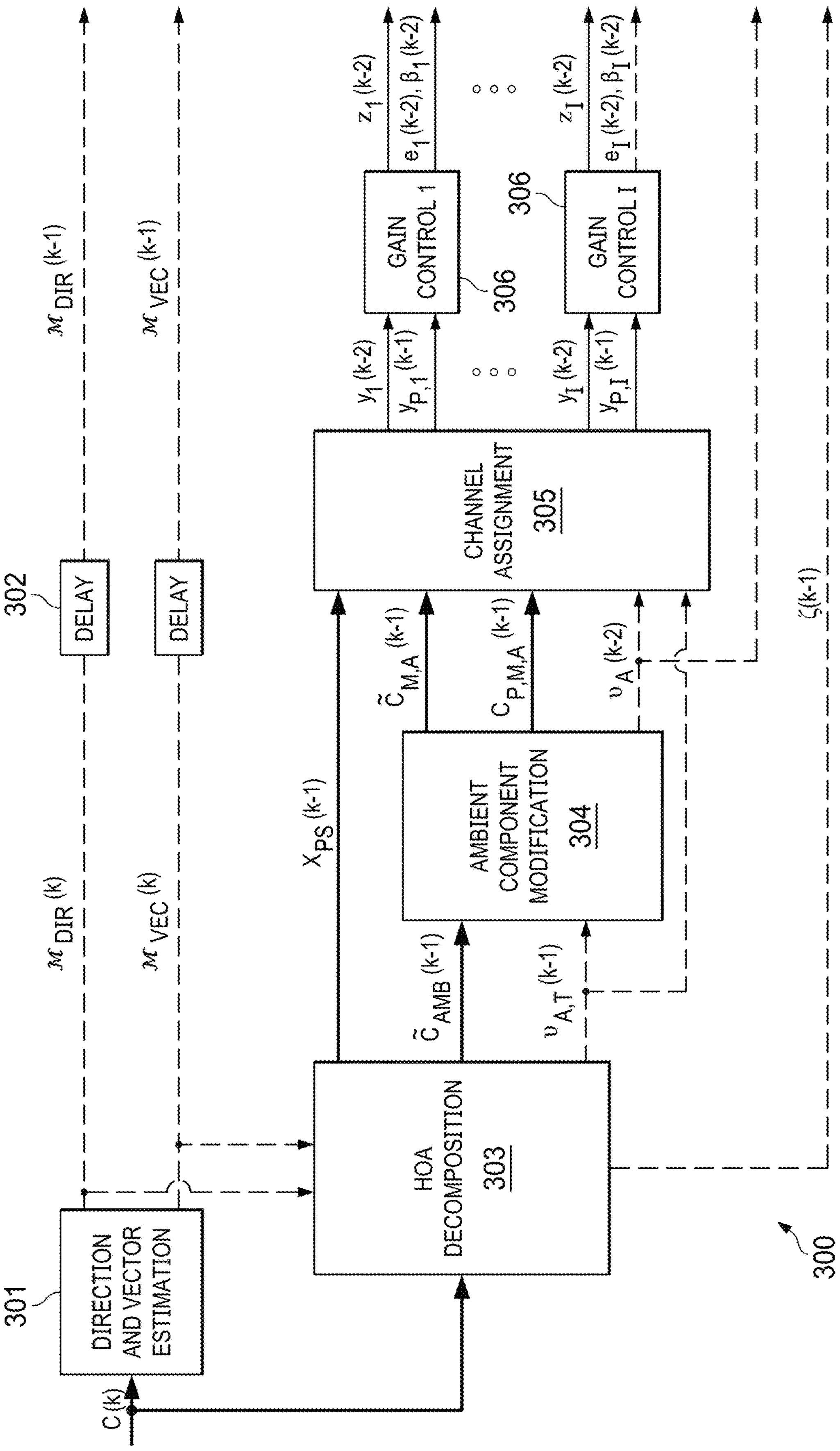
FIG. 3 illustrates an exemplary structure of an architecture of a spatial HOA encoding and perceptual encoding portion of a HOA compressor according to one embodiment of the invention.

FIG. 3 shows the structure of an architecture of a spatial HOA encoding and perceptual encoding portion of a HOA compressor according to one embodiment of the invention.

To include also the predominant sound components at a low spatial resolution into the base layer, the ambient HOA component $C_{AMB}(k-1)$, which is output by the HOA Decomposition processing in the spatial HOA encoder (see FIG. 1A), is replaced by a modified version $$\tilde{C}_{AMB}(k-1) = \begin{bmatrix} \tilde{c}_{AMB,1}(k-1) \\ \tilde{c}_{AMB,2}(k-1) \\ \vdots \\ \tilde{c}_{AMB,o}(k-1) \end{bmatrix} \quad (2)$$

whose elements are given by $$\tilde{c}_{AMB,n}(k-1) = \begin{cases} c_n(k-1) & \text{for } 1 \le n \le O_{MIN} \\ c_{AMB,n}(k-1) & \text{for } O_{MIN}+1 \le n \le O \end{cases} \quad (3)$$

In other words, the first $O_{MIN}$ coefficient sequences of the ambient HOA component which are supposed to be always transmitted in a spatially transformed form, are replaced by the coefficient sequences of the original HOA component. The other processing blocks of the spatial HOA encoder can remain unchanged.

It is important to note that this change of the HOA Decomposition processing can be seen as an initial operation making the HOA compression work in a so-called "dual layer" or "two layer" mode. This mode provides a bit stream that can be split up into a low quality Base Layer and an Enhancement Layer. Using or not this mode can be signalized by a single bit in access units of the total bit stream.

Figure 4:
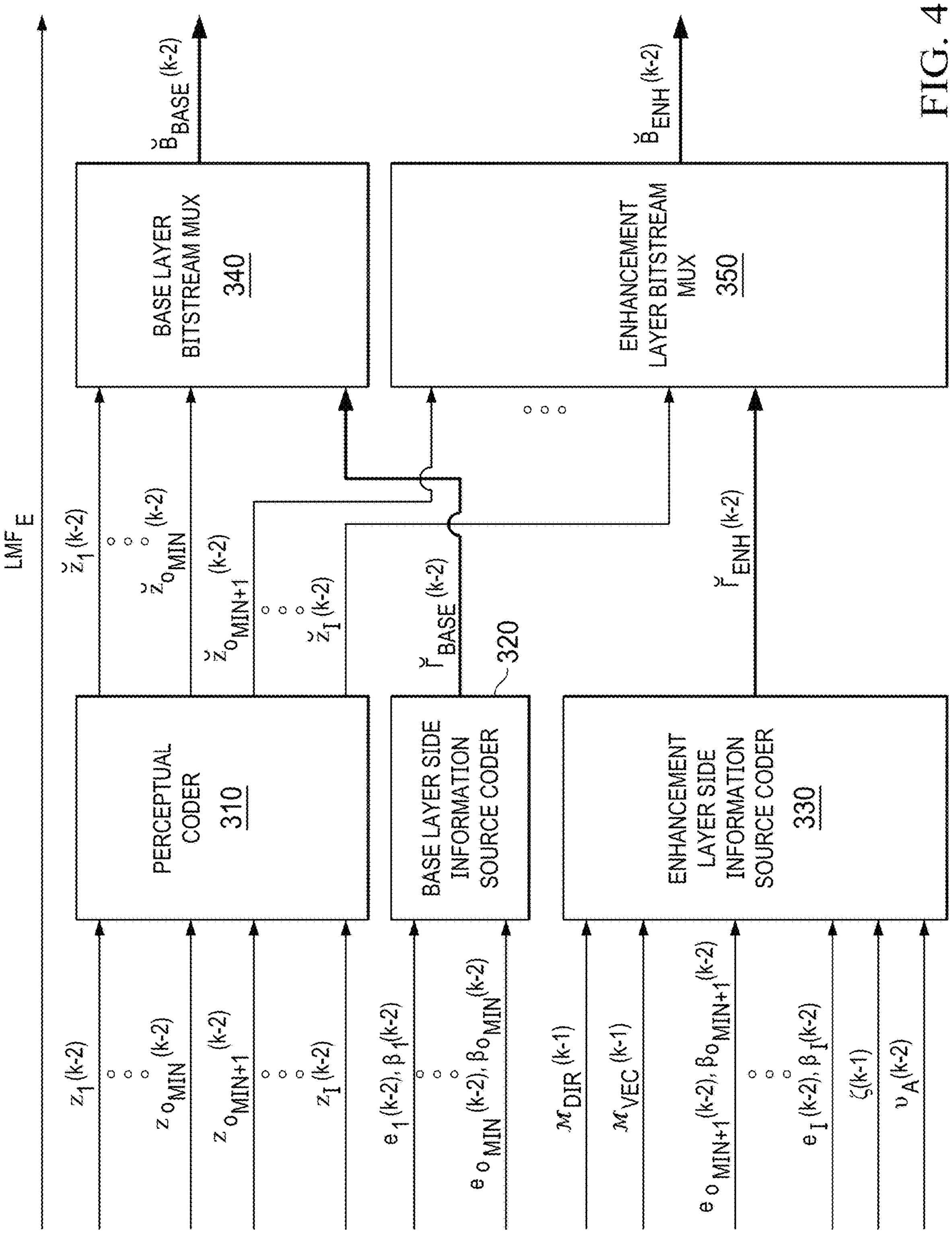
FIG. 4 illustrates an exemplary structure of an architecture of a source coder portion of a HOA compressor according to one embodiment of the invention.

A possible consequent modification of the bit stream multiplexing to provide bit streams for a base layer and an enhancement layer is illustrated in FIGS. 3 and 4, as described further below.

The base layer bit stream $\breve{B}_{BASE}(k-2)$ only includes the perceptually encoded signals $\breve{z}_i(k-2)$, $i=1, \ldots, O_{MIN}$, and the corresponding coded gain control side information, consisting of the exponents $e_i(k-2)$ and the exception flags $\beta_i(k-2)$, $i=1, \ldots, O_{MIN}$. The remaining perceptually encoded signals $\breve{z}_i(k-2)$, $i=O_{MIN}+1, \ldots, O$ and the encoded remaining side information are included into the enhancement layer bit stream. The base layer and enhancement layer bit streams $\breve{B}_{BASE}(k-2)$ and $\breve{B}_{ENH}(k-2)$ are then jointly transmitted instead of the former total bit stream $\breve{B}(k-2)$.

In FIG. 3 and FIG. 4, an apparatus for compressing a HOA signal being an input HOA representation with input time frames (C(k)) of HOA coefficient sequences is shown.

Said apparatus comprises a spatial HOA encoding and perceptual encoding portion for spatial HOA encoding of the input time frames and subsequent perceptual encoding, which is shown in FIG. 3, and a source coder portion for source encoding, which is shown in FIG. 4.

The spatial HOA encoding and perceptual encoding portion 300 comprises a Direction and Vector Estimation block 301, delay 302, a HOA Decomposition block 303, an Ambient Component Modification block 304, a Channel Assignment block 305, and a plurality of Gain Control blocks 306.

The Direction and Vector Estimation block 301 is adapted for performing Direction and Vector Estimation processing of the HOA signal, wherein data comprising first tuple sets $\mathcal{M}_{DIR}(k)$ for directional signals and second tuple sets $\mathcal{M}_{VEC}(k)$ for vector based signals are obtained, each of the first tuple sets $\mathcal{M}_{DIR}(k)$ comprising an index of a directional signal and a respective quantized direction, and each of the second tuple sets $\mathcal{M}_{VEC}(k)$ comprising an index of a vector based signal and a vector defining the directional distribution of the signals.

The HOA Decomposition block 303 is adapted for decomposing each input time frame of the HOA coefficient sequences into a frame of a plurality of predominant sound signals $X_{PS}(k-1)$ and a frame of an ambient HOA component $\tilde{C}_{AMB}(k-1)$, wherein the predominant sound signals $X_{PS}(k-1)$ comprise said directional sound signals and said vector based sound signals, and wherein the ambient HOA component $\tilde{C}_{AMB}(k-1)$ comprises HOA coefficient sequences representing a residual between the input HOA representation and the HOA representation of the predominant sound signals, and wherein the decomposing further provides prediction parameters $\sqcup$ (k−1) and a target assignment vector $v_{A,T}(k-1)$. The prediction parameters $\underline{\ }$ (k−1) describe how to predict portions of the HOA signal representation from the directional signals within the predominant sound signals $X_{PS}(k-1)$ so as to enrich predominant sound HOA components, and the target assignment vector $v_{A,T}(k-1)$ contains information about how to assign the predominant sound signals to a given number I of channels.

The Ambient Component Modification block 304 is adapted for modifying the ambient HOA component $C_{AMB}(k-1)$ according to the information provided by the target assignment vector $v_{A,T}(k-1)$, wherein it is determined which coefficient sequences of the ambient HOA component $C_{AMB}(k-1)$ are to be transmitted in the given number I of channels, depending on how many channels are occupied by predominant sound signals, and wherein a modified ambient HOA component $C_{M,A}(k-2)$ and a temporally predicted modified ambient HOA component $C_{P,M,A}(k-1)$ are obtained, and wherein a final assignment vector $v_A(k-2)$ is obtained from information in the target assignment vector $v_{A,T}(k-1)$.

The Channel Assignment block 305 is adapted for assigning the predominant sound signals $X_{PS}(k-1)$ obtained from the decomposing, the determined coefficient sequences of the modified ambient HOA component $C_{M,A}(k-2)$ and of the temporally predicted modified ambient HOA component $C_{P,M,A}(k-1)$ to the given number I of channels using the information provided by the final assignment vector $V_A(k-2)$, wherein transport signals $y_i(k-2)$, $i=1, \ldots, I$ and predicted transport signals $y_{P,i}(k-2)$, $i=1, \ldots, I$ are obtained.

The plurality of Gain Control blocks 306 is adapted for performing gain control (805) to the transport signals $y_i(k-2)$ and the predicted transport signals $y_{P,i}(k-2)$, wherein gain modified transport signals $z_i(k-2)$, exponents $e_i(k-2)$ and exception flags $\beta_i(k-2)$ are obtained.

FIG. 4 shows the structure of an architecture of a source coder portion of a HOA compressor according to one embodiment of the invention. The source coder portion as shown in FIG. 4 comprises a Perceptual Coder 310, a Side Information Source Coder block with two coders 320,330, namely a Base Layer Side Information Source Coder 320 and an Enhancement Layer Side Information Encoder 330, and two multiplexers 340,350, namely a Base Layer Bitstream Multiplexer 340 and an Enhancement Layer Bitstream Multiplexer 350. The Side Information Source Coders may be in a single Side Information Source Coder block.

The Perceptual Coder 310 is adapted for perceptually coding 806 said gain modified transport signals $z_i(k-2)$, wherein perceptually encoded transport signals $\check{z}_i(k-2)$, i=1, . . . , I are obtained.

The Side Information Source Coders 320,330 are adapted for encoding side information comprising said exponents $e_i(k-2)$ and exception flags $\beta_i(k-2)$, said first tuple sets $\mathcal{M}_{DIR}(k)$ and second tuple sets $\mathcal{M}_{VEC}(k)$, said prediction parameters □ (k−1) and said final assignment vector $v_A(k-2)$, wherein encoded side information $\check{\Gamma}(k-2)$ is obtained.

The multiplexers 340,350 are adapted for multiplexing the perceptually encoded transport signals $\check{z}_i(k-2)$ and the encoded side information $\check{\Gamma}(k-2)$ into a multiplexed data stream $\check{B}(k-2)$, wherein the ambient HOA component $\tilde{C}_{AMB}(k-1)$ obtained in the decomposing comprises first HOA coefficient sequences of the input HOA representation $c_n(k-1)$ in $O_{MIN}$ lowest positions (i.e. those with lowest indices) and second HOA coefficient sequences $c_{AMB,n}(k-1)$ in remaining higher positions. As explained below with respect to eq. (4)-(6), the second HOA coefficient sequences are part of an HOA representation of a residual between the input HOA representation and the HOA representation of the predominant sound signals. Further, the first $O_{MIN}$ exponents $e_i(k-2)$, i=1, . . . , $O_{MIN}$ and exception flags $\beta_i(k-2)$, i=1, . . . , $O_{MIN}$ are encoded in a Base Layer Side Information Source Coder 320, wherein encoded Base Layer side information $\check{\Gamma}_{BASE}(k-2)$ is obtained, and wherein $O_{MIN}=(N_{MIN}+1)^2$ and $O=(N+1)^2$, with $N_{MIN}\leq N$ and $O_{MIN}\leq I$ and $N_{MIN}$ is a predefined integer value. The first $O_{MIN}$ perceptually encoded transport signals $\check{z}_i(k-2)$, i=1, . . . , $O_{MIN}$ and the encoded Base Layer side information $\check{\Gamma}_{BASE}(k-2)$ are multiplexed in a Base Layer Bitstream Multiplexer 340 (which is one of said multiplexers), wherein a Base Layer bitstream $\check{B}_{BASE}(k-2)$ is obtained. The Base Layer Side Information Source Coder 320 is one of the Side Information Source Coders, or it is within a Side Information Source Coder block.

The remaining $I-O_{MIN}$ exponents $e_i(k-2)$, $i=O_{MIN}+1$, . . . , I and exception flags $\beta_i(k-2)$, $i=O_{MIN}+1$, . . . , I, said first tuple sets $\mathcal{M}_{DIR}(k-1)$ and second tuple sets $\mathcal{M}_{VEC}(k-1)$, said prediction parameters ⊔ (k−1) and said final assignment vector $v_A(k-2)$ are encoded in an Enhancement Layer Side Information Encoder 330, wherein encoded enhancement layer side information $\check{\Gamma}_{ENH}(k-2)$ is obtained. The Enhancement Layer Side Information Source Coder 330 is one of the Side Information Source Coders, or is within a Side Information Source Coder block.

The remaining $I-O_{MIN}$ perceptually encoded transport signals $\check{z}_i(k-2)$, $i=O_{MIN}+1$, . . . , I and the encoded enhancement layer side information $\check{\Gamma}_{ENH}(k-2)$ are multiplexed in an Enhancement Layer Bitstream Multiplexer 350 (which is also one of said multiplexers), wherein an Enhancement Layer bitstream $\check{B}_{ENH}(k-2)$ is obtained. Further, a mode indication $LMF_E$ is added in a multiplexer or an indication insertion block. The mode indication $LMF_E$ signalizes usage of a layered mode, which is used for correct decompression of the compressed signal.

In one embodiment, the apparatus for encoding further comprises a mode selector adapted for selecting a mode, the mode being indicated by the mode indication $LMF_E$ and being one of a layered mode and a non-layered mode. In the non-layered mode, the ambient HOA component $\tilde{C}_{AMB}(k-1)$ comprises only HOA coefficient sequences representing a residual between the input HOA representation and the HOA representation of the predominant sound signals (i.e., no coefficient sequences of the input HOA representation).

Proposed amendments of the HOA decompression are described in the following.

In the layered mode, the modification of the ambient HOA component $C_{AMB}(k-1)$ in the HOA compression is considered at the HOA decompression by appropriately modifying the HOA composition.

Figure 5:
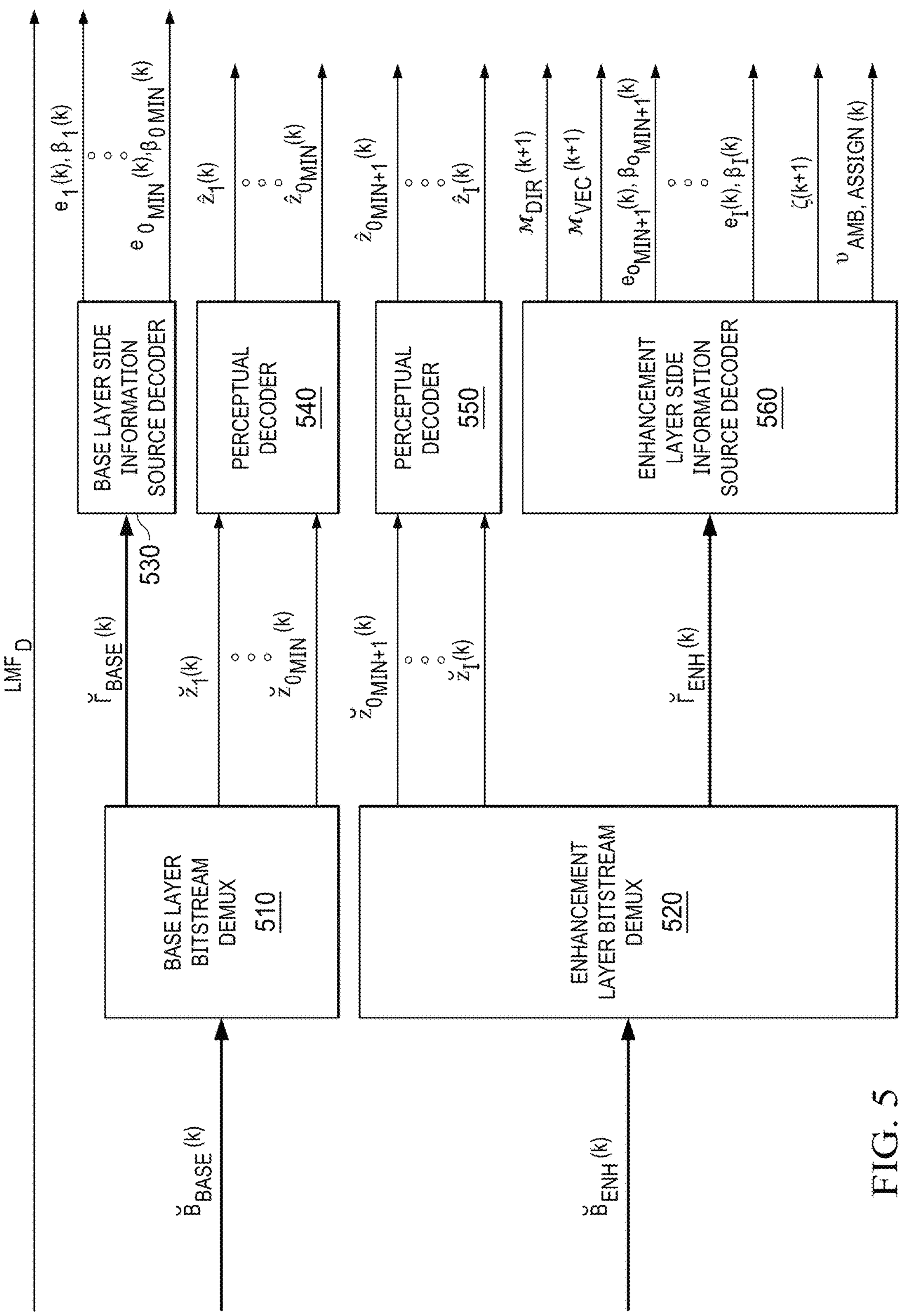
FIG. 5 illustrates an exemplary structure of an architecture of a perceptual decoding and source decoding portion of a HOA decompressor according to one embodiment of the invention.

In the HOA decompressor, the demultiplexing and decoding of the base layer and enhancement layer bit streams are performed according to FIG. 5. The base layer bit stream $\check{B}_{BASE}(k)$ is de-multiplexed into the coded representation of the base layer side information and the perceptually encoded signals. Subsequently, the coded representation of the base layer side information and the perceptually encoded signals are decoded to provide the exponents $e_i(k)$ and the exception flags on the one hand, and the perceptually decoded signals on the other hand. Similarly, the enhancement layer bit stream is de-multiplexed and decoded to provide the perceptually decoded signals and the remaining side information (see FIG. 5). With this layered mode, the spatial HOA decoding part also has to be modified to consider the modification of the ambient HOA component CAMB(k−1) in the spatial HOA encoding. The modification is accomplished in the HOA composition.

In particular, the reconstructed HOA representation $$\hat{C}(k-1)=\hat{C}_{PS}(k-1)+\hat{C}_{AMB}(k-1) \tag{4}$$

is replaced by its modified version $$\tilde{\hat{C}}(k-1)=\begin{bmatrix}\tilde{\hat{c}}_1(k-1)\\ \tilde{\hat{c}}_2(k-1)\\ \vdots\\ \tilde{\hat{c}}_O(k-1)\end{bmatrix} \tag{5}$$

whose elements are given by $$\tilde{\hat{c}}_n(k-1)=\begin{cases}\hat{c}_{AMB,n}(k-1) & \text{for } 1\leq n\leq O_{MIN}\\ \hat{c}_n(k-1) & \text{for } O_{MIN}+1\leq n\leq O\end{cases} \tag{6}$$

That means that the predominant sound HOA component is not added to the ambient HOA component for the first $O_{MIN}$ coefficient sequences, since it is already included therein. All other processing blocks of the HOA spatial decoder remain unchanged.

In the following, the HOA decompression in the pure presence of a low quality base layer bit stream $\check{B}_{BASE}(k)$ is briefly considered.

The bit stream is first de-multiplexed and decoded to provide the reconstructed signals $\hat{z}_i(k)$ and the corresponding gain control side information, consisting of the exponents $e_i(k)$ and the exception flags $\beta_i(k)$, $i=1, \ldots, O_{MIN}$. Note that in absence of the enhancement layer, the perceptually coded signals $\check{z}_i(k-2)$, $i=O_{MIN}+1, \ldots, O$, are not available. A possible way of addressing this situation is to set the signals $\hat{z}_i(k)$, $i=O_{MIN}+1, \ldots, O$, to zero, which automatically causes the reconstructed predominant sound component $C_{PS}(k-1)$ to be zero.

In a next step, in the spatial HOA decoder, the first $O_{MIN}$ Inverse Gain Control processing blocks provide gain corrected signal frames $\hat{y}_i(k)$, $i=1, \ldots, O_{MIN}$, which are used to construct the frame $C_{I,AMB}(k)$ of an intermediate representation of the ambient HOA component by the Channel Reassignment. Note that the set $\mathcal{J}_{AMB,ACT}(k)$ of indices of coefficient sequences of the ambient HOA component, which are active in the k-th frame, contains only the indices $1, 2, \ldots, O_{MIN}$. In the Ambience Synthesis, the spatial transform of the first $O_{MIN}$ coefficient sequences is reverted to provide the ambient HOA component frame $C_{AMB}(k-1)$. Finally, the reconstructed HOA representation is computed according to eq. (6).

Figure 6:
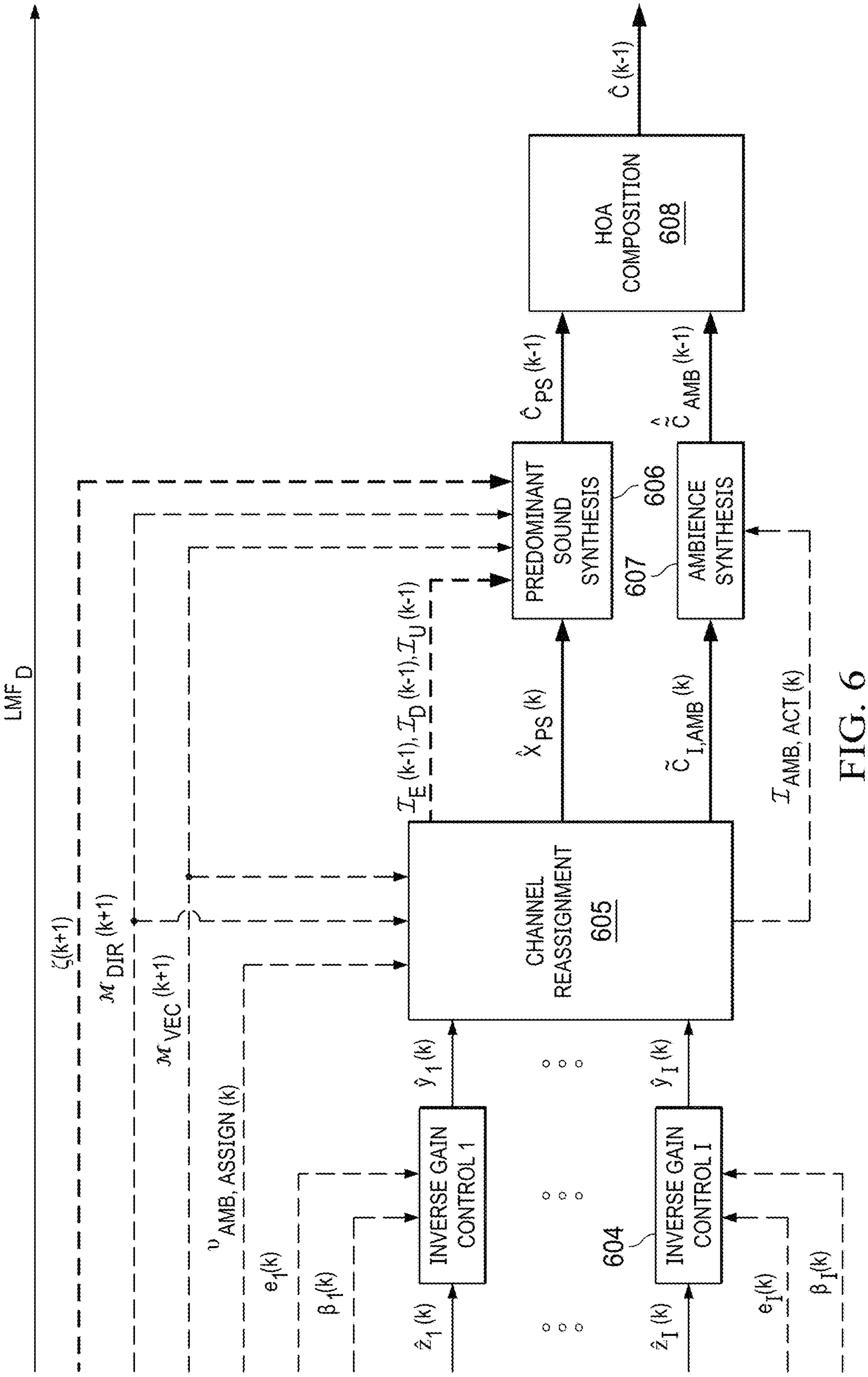
FIG. 6 illustrates an exemplary structure of an architecture of a spatial HOA decoding portion of a HOA decompressor according to one embodiment of the invention.

FIG. 5 and FIG. 6 show the structure of an architecture of a HOA decompressor according to one embodiment of the invention. The apparatus comprises a perceptual decoding and source decoding portion as shown in FIG. 5, a spatial HOA decoding portion as shown in FIG. 6, and a mode detector adapted for detecting a layered mode indication $LMF_D$ indicating that the compressed HOA signal comprises a compressed base layer bitstream $\check{B}_{BASE}(k)$ and a compressed enhancement layer bitstream.

FIG. 5 shows the structure of an architecture of a perceptual decoding and source decoding portion of a HOA decompressor according to one embodiment of the invention.

The perceptual decoding and source decoding portion comprises a first demultiplexer 510, a second demultiplexer 520, a Base Layer Perceptual Decoder 540 and an Enhancement Layer Perceptual Decoder 550, a Base Layer Side Information Source Decoder 530 and an Enhancement Layer Side Information Source Decoder 560.

The first demultiplexer 510 is adapted for demultiplexing the compressed base layer bitstream $\check{B}_{BASE}(k)$, wherein first perceptually encoded transport signals $\check{z}_i(k)$, $i=1, \ldots, O_{MIN}$ and first encoded side information $\check{\Gamma}_{BASE}(k)$ are obtained.

The second demultiplexer 520 is adapted for demultiplexing the compressed enhancement layer bitstream $\check{B}_{ENH}(k)$, wherein second perceptually encoded transport signals $\check{z}_i(k)$, $i=O_{MIN}+1, \ldots, I$ and second encoded side information $\check{\Gamma}_{ENH}(k)$ are obtained.

The Base Layer Perceptual Decoder 540 and the Enhancement Layer Perceptual Decoder 550 are adapted for perceptually decoding 904 the perceptually encoded transport signals $\check{z}_i(k)$, $i=1, \ldots, I$, wherein perceptually decoded transport signals $\check{z}_i(k)$ are obtained, and wherein in the Base Layer Perceptual Decoder 540 said first perceptually encoded transport signals $\check{z}_i(k)$, $i=1, \ldots, O_{MIN}$ of the base layer are decoded and first perceptually decoded transport signals $\check{z}_i(k)$, $i=1, \ldots, O_{MIN}$ are obtained. In the Enhancement Layer Perceptual Decoder 550, said second perceptually encoded transport signals $\check{z}_i(k)$, $i=O_{MIN}+1, \ldots, I$ of the enhancement layer are decoded and second perceptually decoded transport signals $\check{z}_i(k)$, $i=O_{MIN}+1, \ldots, I$ are obtained.

The Base Layer Side Information Source Decoder 530 is adapted for decoding 905 the first encoded side information $\check{\Gamma}_{BASE}(k)$, wherein first exponents $e_i(k)$, $i=1, \ldots, O_{MIN}$ and first exception flags $\beta_i(k)$, $i=1, \ldots, O_{MIN}$ are obtained.

The Enhancement Layer Side Information Source Decoder 560 is adapted for decoding 906 the second encoded side information $\check{\Gamma}_{ENH}(k)$, wherein second exponents $e_i(k)$, $i=O_{MIN}+1, \ldots, I$ and second exception flags $\beta_i(k)$, $i=O_{MIN}+1, \ldots, I$ are obtained, and wherein further data are obtained. The further data comprise a first tuple set $\mathcal{M}_{DIR}(k+1)$ for directional signals and a second tuple set $\mathcal{M}_{VEC}(k+1)$ for vector based signals. Each tuple of the first tuple set $\mathcal{M}_{DIR}(k+1)$ comprises an index of a directional signal and a respective quantized direction, and each tuple of the second tuple set $\mathcal{M}_{VEC}(k+1)$ comprises an index of a vector based signal and a vector defining the directional distribution of the vector based signal. Further, prediction parameters: □(k+1) and an ambient assignment vector $v_{AMB,ASSIGN}(k)$ are obtained, wherein the ambient assignment vector $v_{AMB,ASSIGN}(K)$ comprises components that indicate for each transmission channel if and which coefficient sequence of the ambient HOA component it contains.

FIG. 6 shows the structure of an architecture of a spatial HOA decoding portion of a HOA decompressor according to one embodiment of the invention. The spatial HOA decoding portion comprises a plurality of inverse gain control units 604, a Channel Reassignment block 605, a Predominant Sound Synthesis block 606, and an Ambient Synthesis block 607, a HOA Composition block 608.

The plurality of inverse gain control units 604 are adapted for performing inverse gain control, wherein said first perceptually decoded transport signals $\hat{z}_i(k)$, $i=1, \ldots, O_{MIN}$ are transformed into first gain corrected signal frames $\hat{y}_i(k)$, $i=1, \ldots, O_{MIN}$ according to the first exponents $e_i(k)$, $i=1, \ldots, O_{MIN}$ and the first exception flags $\beta_i(k)$, $i=1, \ldots, O_{MIN}$, and wherein the second perceptually decoded transport signals $\hat{z}_i(k)$, $i=O_{MIN}+1, \ldots, I$ are transformed into second gain corrected signal frames $\hat{y}_i(k)$, $i=O^{MIN}+1, \ldots, I$ according to the second exponents $e_i(k)$, $i=O_{MIN}+1, \ldots, I$ and the second exception flags $\beta_i(k)$, $i=O_{MIN}+1, \ldots, I$.

The Channel Reassignment block 605 is adapted for redistributing 911 the first and second gain corrected signal frames $\hat{y}_i(k)$, $i=1, \ldots, I$ to I channels, wherein frames of predominant sound signals $\hat{X}_{PS}(k)$ are reconstructed, the predominant sound signals comprising directional signals and vector based signals, and wherein a modified ambient HOA component $\hat{C}_{I,AMB}(k)$ is obtained, and wherein the assigning is made according to said ambient assignment vector $v_{AMB,ASSIGN}(k)$ and to information in said first and second tuple sets $\mathcal{M}_{DIR}(k+1)$, $\mathcal{M}_{VEC}(k+1)$.

Further, the Channel Reassignment block 605 is adapted for generating a first set of indices $\mathcal{J}_{AMB,ACT}(k)$ of coefficient sequences of the modified ambient HOA component that are active in a k'h frame, and a second set of indices $\mathcal{J}_E(k-1)$, $\mathcal{J}_D(k-1)$, $\mathcal{J}_U(k-1)$ of coefficient sequences of the modified ambient HOA component that have to be enabled, disabled and to remain active in the $(k-1)^{th}$ frame.

The Predominant Sound Synthesis block 606 is adapted for synthesizing 912 a HOA representation of the predominant HOA sound components $\hat{C}_{PS}(k-1)$ from said predominant sound signals $\hat{X}_{PS}(k)$, wherein the first and second tuple sets $\mathcal{M}_{DIR}(k+1)$, $\mathcal{M}_{VEC}(k+1)$, the prediction parameters □(k+1) and the second set of indices $\mathcal{J}_E(k-1)$, $\mathcal{J}_D(k-1)$, $\mathcal{J}_U(k-1)$ are used.

The Ambient Synthesis block 607 is adapted for synthesizing 913 an ambient HOA component $\mathring{C}_{AMB}(k-1)$ from the modified ambient HOA component $\hat{C}_{I,AMB}(k)$, wherein an inverse spatial transform for the first $O_{MIN}$ channels is made and wherein the first set of indices $\mathcal{J}_{AMB,ACT}(k)$ is used, the first set of indices being indices of coefficient sequences of the ambient HOA component that are active in the $k^{th}$ frame.

If the layered mode indication $LMF_D$ indicates a layered mode with at least two layers, the ambient HOA component comprises in its $O_{MIN}$ lowest positions (i.e. those with lowest indices) HOA coefficient sequences of the decompressed HOA signal $\hat{C}(k-1)$, and in remaining higher positions coefficient sequences that are part of an HOA representation of a residual. This residual is a residual between the decompressed HOA signal $\hat{C}(k-1)$ and 914 the HOA representation of the predominant HOA sound components $\hat{C}_{PS}(k-1)$.

On the other hand, if the layered mode indication $LMF_D$ indicates a single-layer mode, there are no HOA coefficient sequences of the decompressed HOA signal $\hat{C}(k-1)$ comprised, and the ambient HOA component is a residual between the decompressed HOA signal $\hat{C}(k-1)$ and the HOA representation of the predominant sound components $\hat{C}_{PS}(k-1)$.

The HOA Composition block 608 is adapted for adding the HOA representation of the predominant sound components to the ambient HOA component $\hat{C}_{PS}(k-1)\hat{\hat{C}}_{AMB}(k-1)$, wherein coefficients of the HOA representation of the predominant sound signals and corresponding coefficients of the ambient HOA component are added, and wherein the decompressed HOA signal $\hat{C}'(k-1)$ is obtained, and wherein, if the layered mode indication $LMF_D$ indicates a layered mode with at least two layers, only the highest $I-O_{MIN}$ coefficient channels are obtained by addition of the predominant HOA sound components $\hat{C}_{PS}(k-1)$ and the ambient HOA component $\hat{\hat{C}}_{AMB}(k-1)$, and the lowest $O_{MIN}$ coefficient channels of the decompressed HOA signal $\hat{C}'(k-1)$ are copied from the ambient HOA component $\hat{\hat{C}}_{AMB}(k-1)$. On the other hand, if the layered mode indication $LMF_D$ indicates a single-layer mode, all coefficient channels of the decompressed HOA signal $\hat{C}'(k-1)$ are obtained by addition of the predominant HOA sound components $\hat{C}_{PS}(k-1)$ and the ambient HOA component $\hat{\hat{C}}_{AMB}(k-1)$.

Figure 7:
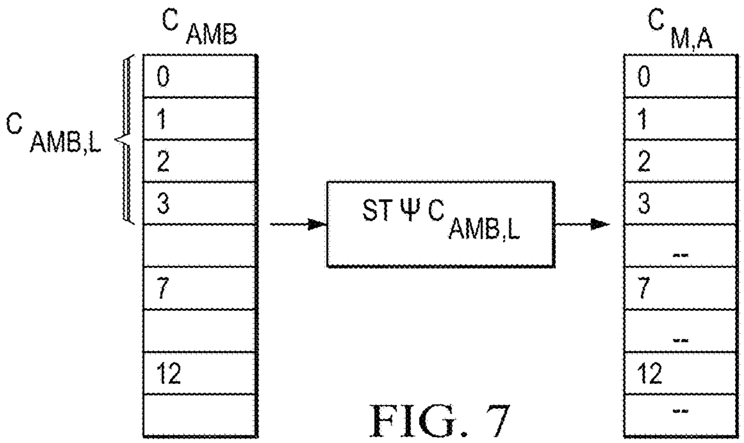
FIG. 7 illustrates an exemplary transformation of frames from ambient HOA signals to modified ambient HOA signals.

FIG. 7 shows transformation of frames from ambient HOA signals to modified ambient HOA signals.

Figure 8:
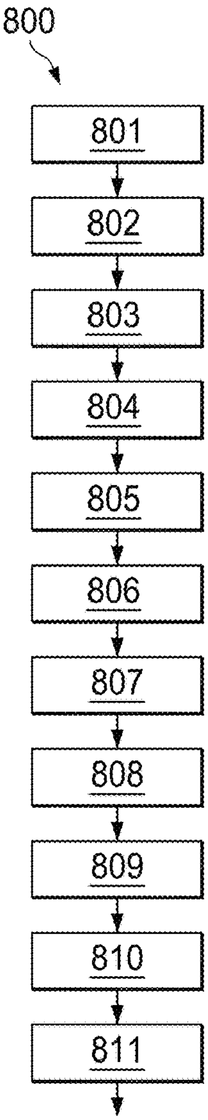
FIG. 8 illustrates a flow-chart of a method for compressing a HOA signal.

FIG. 8 shows a flow-chart of a method for compressing a HOA signal.

The method 800 for compressing a Higher Order Ambisonics (HOA) signal being an input HOA representation of an order N with input time frames C(k) of HOA coefficient sequences comprises spatial HOA encoding of the input time frames and subsequent perceptual encoding and source encoding.

The spatial HOA encoding comprises steps of performing Direction and Vector Estimation processing 801 of the HOA signal in a Direction and Vector Estimation block 301, wherein data comprising first tuple sets $\mathcal{M}_{DIR}(k)$ for directional signals and second tuple sets $\mathcal{M}_{VEC}(k)$ for vector based signals are obtained, each of the first tuple sets $\mathcal{M}_{DIR}(k)$ comprising an index of a directional signal and a respective quantized direction, and each of the second tuple sets $\mathcal{M}_{VEC}(k)$ comprising an index of a vector based signal and a vector defining the directional distribution of the signals, decomposing 802 in a HOA Decomposition block 303 each input time frame of the HOA coefficient sequences into a frame of a plurality of predominant sound signals $X_{PS}(k-1)$ and a frame of an ambient HOA component $\tilde{C}_{AMB}(k-1)$, wherein the predominant sound signals $X_{PS}(k-1)$ comprise said directional sound signals and said vector based sound signals, and wherein the ambient HOA component $\tilde{C}_{AMB}(k-1)$ comprises HOA coefficient sequences representing a residual between the input HOA representation and the HOA representation of the predominant sound signals, and wherein the decomposing 702 further provides prediction parameters □ (k−1) and a target assignment vector $v_{A,T}(k-1)$, the prediction parameters □ (k−1) describing how to predict portions of the HOA signal representation from the directional signals within the predominant sound signals $X_{PS}(k-1)$ so as to enrich predominant sound HOA components, and the target assignment vector $v_{A,T}(k-1)$ containing information about how to assign the predominant sound signals to a given number I of channels, modifying 803 in an Ambient Component Modification block 304 the ambient HOA component $C_{AMB}(k-1)$ according to the information provided by the target assignment vector $v_{A,T}(k-1)$, wherein it is determined which coefficient sequences of the ambient HOA component $C_{AMB}(k-1)$ are to be transmitted in the given number I of channels, depending on how many channels are occupied by predominant sound signals, and wherein a modified ambient HOA component $C_{M,A}(k-2)$ and a temporally predicted modified ambient HOA component $C_{P,M,A}(k-1)$ are obtained, and wherein a final assignment vector $v_A(k-2)$ is obtained from information in the target assignment vector $v_{A,T}(k-1)$, assigning 804 in a Channel Assignment block 105 the predominant sound signals $X_{PS}(k-1)$ obtained from the decomposing, and the determined coefficient sequences of the modified ambient HOA component $C_{M,A}(k-2)$ and of the temporally predicted modified ambient HOA component $C_{P,M,A}(k-1)$ to the given number I of channels using the information provided by the final assignment vector $v_A(k-2)$, wherein transport signals $y_i(k-2)$, i=1, . . . , I and predicted transport signals $y_{P,i}(k-2)$, i=1, . . . , I are obtained, and performing gain control 805 to the transport signals $y_i(k-2)$ and the predicted transport signals $y_{P,i}(k-2)$ in a plurality of Gain Control blocks 306, wherein gain modified transport signals $z_i(k-2)$, exponents $e_i(k-2)$ and exception flags $\beta_i(k-2)$ are obtained.

The perceptual encoding and source encoding comprises steps of perceptually coding 806 in a Perceptual Coder 310 said gain modified transport signals $z_i(k-2)$, wherein perceptually encoded transport signals $\check{z}_i(k-2)$, i=1, . . . , I are obtained, encoding 807 in one or more Side Information Source Coders 320,330 side information comprising said exponents $e_i(k-2)$ and exception flags $\beta_i(k-2)$, said first tuple sets $\mathcal{M}_{DIR}(k)$ and second tuple sets $\mathcal{M}_{VEC}(k)$, said prediction parameters □ (k−1) and said final assignment vector $v_A(k-2)$, wherein encoded side information $\check{\Gamma}(k-2)$ is obtained; and multiplexing 808 the perceptually encoded transport signals $\check{z}_i(k-2)$ and the encoded side information $\check{\Gamma}(k-2)$, wherein a multiplexed data stream $\check{B}(k-2)$ is obtained.

The ambient HOA component $\tilde{C}_{AMB}(k-1)$ obtained in the decomposing step 802 comprises first HOA coefficient sequences of the input HOA representation $c_n(k-1)$ in $O_{MIN}$ lowest positions (i.e.. those with lowest indices) and second HOA coefficient sequences $c_{AMB,n}(k-1)$ in remaining higher positions. The second coefficient sequences are part of an HOA representation of a residual between the input HOA representation and the HOA representation of the predominant sound signals.

The first $O_{MIN}$ exponents $e_i(k-2)$, $i=1, \ldots, O_{MIN}$ and exception flags $\beta_i(k-2)$, $i=1, \ldots, O_{MIN}$ are encoded in a Base Layer Side Information Source Coder 320, wherein encoded Base Layer side information $\check{\Gamma}_{BASE}(k-2)$ is obtained, and wherein $O_{MIN}=(N_{MIN}+1)^2$ and $O=(N+1)^2$, with $N_{MIN} \leq N$ and $O_{MIN} \leq I$ and $N_{MIN}$ is a predefined integer value.

The first $O_{MIN}$ perceptually encoded transport signals $\check{z}_i(k-2)$, $i=1, \ldots, O_{MIN}$ and the encoded Base Layer side information $\check{\Gamma}_{BASE}(k-2)$ are multiplexed 809 in a Base Layer Bitstream Multiplexer 340, wherein a Base Layer bitstream $\check{B}_{BASE}(k-2)$ is obtained.

The remaining $I-O_{MIN}$ exponents $e_i(k-2)$, $i=O_{MIN}+1, \ldots, I$ and exception flags $\beta_i(k-2)$, $i=O_{MIN}+1, \ldots, I$, said first tuple sets $\mathcal{M}_{DIR}(k-1)$ and second tuple sets $\mathcal{M}_{VEC}(k-1)$, said prediction parameters $\sqcup(k-1)$ and said final assignment vector $v_A(k-2)$ (also shown as $v_{AMB,ASSIGN}(k)$ in the Figures) are encoded in an Enhancement Layer Side Information Encoder 330, wherein encoded enhancement layer side information $\check{\Gamma}_{ENH}(k-2)$ is obtained.

The remaining $I-O_{MIN}$ perceptually encoded transport signals $\check{z}$, $(k-2)$, $i=O_{MIN}+1, \ldots, I$ and the encoded enhancement layer side information $\check{\Gamma}_{ENH}(k-2)$ are multiplexed 810 in an Enhancement Layer Bitstream Multiplexer 350, wherein an Enhancement Layer bitstream $\check{B}_{ENH}(k-2)$ is obtained.

A mode indication is added 811 that signalizes usage of a layered mode, as described above. The mode indication is added by an indication insertion block or a multiplexer.

In one embodiment, the method further comprises a final step of multiplexing the Base Layer bitstream $\check{B}_{BASE}(k-2)$, Enhancement Layer bitstream $\check{B}_{ENH}(k-2)$ and mode indication into a single bitstream. In one embodiment, said dominant direction estimation is dependent on a directional power distribution of the energetically dominant HOA components.

In one embodiment, in modifying the ambient HOA component, a fade in and fade out of coefficient sequences is performed if the HOA sequence indices of the chosen HOA coefficient sequences vary between successive frames. In one embodiment, in modifying the ambient HOA component, a partial decorrelation of the ambient HOA component $C_{AMB}(k-1)$ is performed.

In one embodiment, quantized direction comprised in the first tuple sets $\mathcal{M}_{DIR}(k)$ is a dominant direction.

Figure 9:
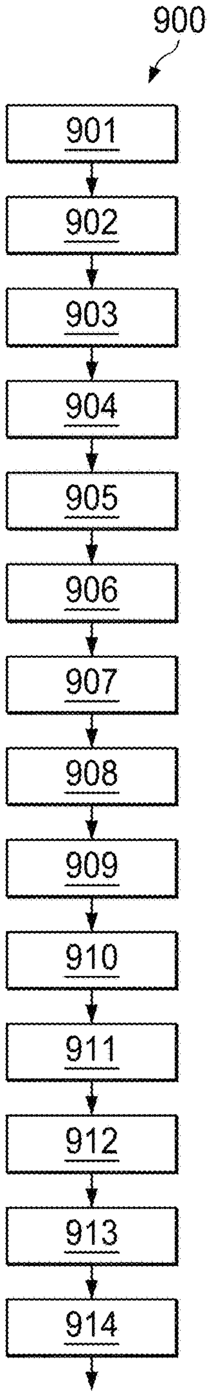
FIG. 9 illustrates a flow-chart of a method for decompressing a compressed HOA signal.

FIG. 9 shows a flow-chart of a method for decompressing a compressed HOA signal.

In this embodiment of the invention, the method 900 for decompressing a compressed HOA signal comprises perceptual decoding and source decoding and subsequent spatial HOA decoding to obtain output time frames $\hat{C}(k-1)$ of HOA coefficient sequences, and the method comprises a step of detecting 901 a layered mode indication $LMF_D$ indicating that the compressed Higher Order Ambisonics (HOA) signal comprises a compressed base layer bitstream $\check{B}_{BASE}(k)$ and a compressed enhancement layer bitstream $\check{B}_{ENH}(k)$.

The perceptual decoding and source decoding comprises steps of

- demultiplexing 902 the compressed base layer bitstream $\check{B}_{BASE}(k)$, wherein first perceptually encoded transport signals $\check{z}_i(k)$, $i=1, \ldots, O_{MIN}$ and first encoded side information $\check{\Gamma}_{BASE}(k)$ are obtained,
- demultiplexing 903 the compressed enhancement layer bitstream $\check{B}_{ENH}(k)$, wherein second perceptually encoded transport signals $\check{z}_i(k)$, $i=O_{MIN}+1, \ldots, I$ and second encoded side information $\check{\Gamma}_{ENH}(k)$ are obtained,
- perceptually decoding 904 the perceptually encoded transport signals $\check{z}(k)$, $i=1, \ldots, I$, wherein perceptually decoded transport signals $\hat{z}_i(k)$ are obtained, and wherein in a Base Layer Perceptual Decoder 540 said first perceptually encoded transport signals $\check{z}_i(k)$, $i=1, \ldots, O_{MIN}$ of the base layer are decoded and first perceptually decoded transport signals $\hat{z}_i(k)$, $i=1, \ldots, O_{MIN}$ are obtained, and wherein in an Enhancement Layer Perceptual Decoder 550 said second perceptually encoded transport signals $\check{z}_i(k)$, $i=O_{MIN}+1, \ldots, I$ of the enhancement layer are decoded and second perceptually decoded transport signals $\hat{z}_i(k)$, $i=O_{MIN}+1, \ldots, I$ are obtained,
- decoding 905 the first encoded side information $\check{\Gamma}_{BASE}(k)$ in a Base Layer Side Information Source Decoder 530, wherein first exponents $e_i(k)$, $i=1, \ldots, O_{MIN}$ and first exception flags $\beta_i(k)$, $i=1, \ldots, O_{MIN}$ are obtained, and
- decoding 906 the second encoded side information $\check{\Gamma}_{ENH}(k)$ in an Enhancement Layer Side Information Source Decoder 560, wherein second exponents $e_i(k)$, $i=O_{MIN}+1, \ldots,$ and second exception flags $\beta_i(k)$, $i=O_{MIN}+1, \ldots, I$ are obtained, and wherein further data are obtained 907, the further data comprising a first tuple set $\mathcal{M}_{DIR}(k+1)$ for directional signals and a second tuple set $\mathcal{M}_{VEC}(k+1)$ for vector based signals, each tuple of the first tuple set $\mathcal{M}_{DIR}(k+1)$ comprising an index of a directional signal and a respective quantized direction, and each tuple of the second tuple set $\mathcal{M}_{VEC}(k+1)$ comprising an index of a vector based signal and a vector defining the directional distribution of the vector based signal, and further wherein prediction parameters $\sqcup(k+1)$ 908 and an ambient assignment vector $v_{AMB,ASSIGN}(k)$ 909 are obtained. The ambient assignment vector $v_{AMB,ASSIGN}(K)$ comprises components that indicate for each transmission channel if and which coefficient sequence of the ambient HOA component it contains.

The spatial HOA decoding comprises steps of

- performing 910 inverse gain control, wherein said first perceptually decoded transport signals $\hat{z}_i(k)$, $i=1, \ldots, O_{MIN}$ are transformed into first gain corrected signal frames $\hat{y}_i(k)$, $i=1, \ldots, O_{MIN}$ according to said first exponents $e_i(k)$, $i=1, \ldots, O_{MIN}$ and said first exception flags $\beta_i(k)$, $i=1, \ldots, O_{MIN}$, and wherein said second perceptually decoded transport signals $\hat{z}_i(k)$, $i=O_{MIN}+1, \ldots, I$ are transformed into second gain corrected signal frames $\hat{y}_i(k)$, $i=O_{MIN}+1, \ldots, I$ according to said second exponents $e_i(k)$, $i=O_{MIN}+1, \ldots, I$ and said second exception flags $(\beta_i(k)$, $i=O_{MIN}+1, \ldots, I$,
- redistributing 911 in a Channel Reassignment block 605 the first and second gain corrected signal frames $\hat{y}_i(k)$, $i=1, \ldots, I$ to I channels, wherein frames of predominant sound signals $\hat{X}_{PS}(k)$ are reconstructed, the predominant sound signals comprising directional signals and vector based signals, and wherein a modified ambient HOA component $\hat{C}_{I,AMB}(k)$ is obtained, and wherein the assigning is made according to said ambient assignment vector $v_{AMB,ASSIGN}(k)$ and to information in said first and second tuple sets $\mathcal{M}_{DIR}(k+1)$, $\mathcal{M}_{VEC}(k+1)$,
- generating 911*b* in the Channel Reassignment block 605 a first set of indices $\mathcal{J}_{AMB,ACT}(k)$ of coefficient sequences of the modified ambient HOA component that are active in the $k^{th}$ frame, and a second set of indices $\mathcal{J}_E(k-1)$, $\mathcal{J}_D(k-1)$, $\mathcal{J}_U(k-1)$ of coefficient sequences of the modified ambient HOA component that have to be enabled, disabled and to remain active in the $(k-1)^{th}$ frame, synthesizing 912 in the Predominant Sound Synthesis block 606 a HOA representation of the predominant HOA sound components $\hat{C}_{PS}(k-1)$ from said predominant sound signals $\hat{X}_{PS}(k)$, wherein the first and second tuple sets $\mathcal{M}_{DIR}(k+1)$, $\mathcal{M}_{VEC}(k+1))$, the prediction parameters $\zeta(k+1)$ and the second set of indices $\mathcal{J}_{E}(k-1)$, $\mathcal{J}_{D}(k-1)$, $\mathcal{J}_{U}(k-1)$ are used, synthesizing 913 in the Ambient Synthesis block 607 an ambient HOA component $\hat{\hat{C}}_{AMB}(k-1)$ from the modified ambient HOA component $\tilde{C}_{I,AMB}(k)$, wherein an inverse spatial transform for the first $O_{MIN}$ channels is made and wherein the first set of indices $\mathcal{J}_{AMB,ACT}(k)$ is used, the first set of indices being indices of coefficient sequences of the ambient HOA component that are active in the $k^{th}$ frame, wherein the ambient HOA component has one of at least two different configurations, depending on the layered mode indication $LMF_D$, and adding 914 the HOA representation of the predominant HOA sound components $\hat{C}_{PS}(k-1)$ and the ambient HOA component $\hat{\hat{C}}_{AMB}(k-1)$ in a HOA Composition block 608, wherein coefficients of the HOA representation of the predominant sound signals and corresponding coefficients of the ambient HOA component are added, and wherein the decompressed HOA signal $\hat{C}(k-1)$ is obtained, and wherein the following conditions apply:

if the layered mode indication $LMF_D$ indicates a layered mode with at least two layers, only the highest $I-O_{MIN}$ coefficient channels are obtained by addition of the predominant HOA sound components $\hat{C}_{PS}(k-1)$ and the ambient HOA component $\hat{\hat{C}}_{AMB}(k-1)$, and the lowest $O_{MIN}$ coefficient channels of the decompressed HOA signal $\hat{C}(k-1)$ are copied from the ambient HOA component $\hat{\hat{C}}_{AMB}(k-1)$. Otherwise, if the layered mode indication $LMF_D$ indicates a single-layer mode, all coefficient channels of the decompressed HOA signal $\hat{C}(k-1)$ are obtained by addition of the predominant HOA sound components $\hat{C}_{PS}(k-1)$ and the ambient HOA component $\hat{\hat{C}}_{AMB}(k-1)$.

The configuration of the ambient HOA component in dependence of the layered mode indication $LMF_D$ is as follows:

If the layered mode indication $LMF_D$ indicates a layered mode with at least two layers, the ambient HOA component comprises in its $O_{MIN}$ lowest positions HOA coefficient sequences of the decompressed HOA signal $\hat{C}(k-1)$, and in remaining higher positions coefficient sequences being part of an HOA representation of a residual between the decompressed HOA signal $\hat{C}(k-1)$ and the HOA representation of the predominant HOA sound components $\hat{C}_{PS}(k-1)$.

On the other hand, if the layered mode indication $LMF_D$ indicates a single-layer mode, the ambient HOA component is a residual between the decompressed HOA signal $\hat{C}(k-1)$ and the HOA representation of the predominant HOA sound components $\hat{C}_{PS}(k-1)$.

In one embodiment, the compressed HOA signal representation is in a multiplexed bitstream, and the method for decompressing the compressed HOA signal further comprises an initial step of demultiplexing the compressed HOA signal representation, wherein said compressed base layer bitstream $\check{B}_{BASE}(k)$, said compressed enhancement layer bitstream $\check{B}_{ENH}(k)$ and said layered mode indication $LMF_D$ are obtained.

Figure 10:
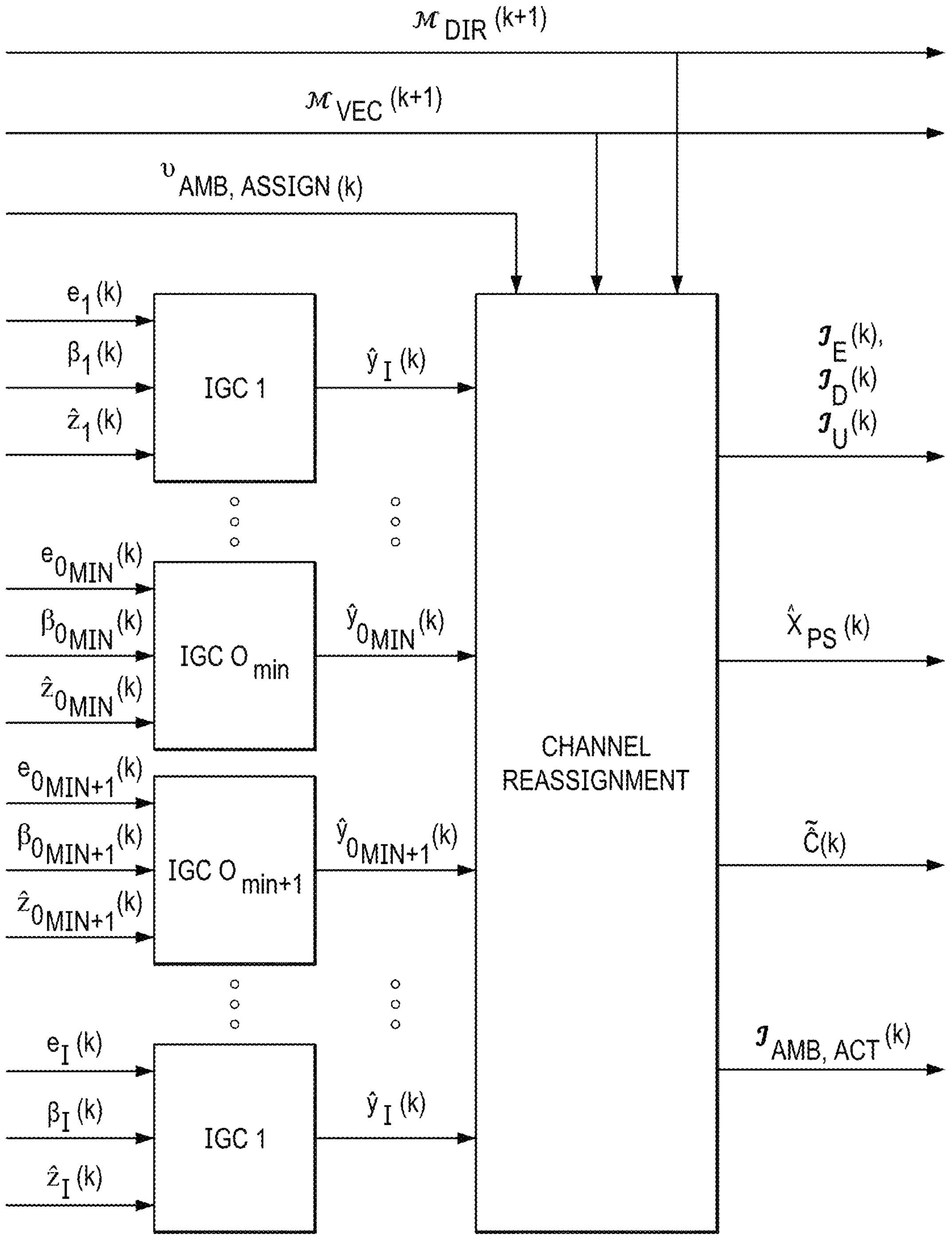
FIG. 10 details of parts of an exemplary architecture of a spatial HOA decoding portion of a HOA decompressor according to one embodiment of the invention.

FIG. 10 shows details of parts of an architecture of a spatial HOA decoding portion of a HOA decompressor according to one embodiment of the invention.

Advantageously, it is possible to decode only the BL, e.g. if no EL is received or if the BL quality is sufficient. For this case, signals of the EL can be set to zero at the decoder. Then, the redistributing 911 the first and second gain corrected signal frames $\hat{y}_i(k)$, $i=1, \ldots, I$ to I channels in the Channel Reassignment block 605 is very simple, since the frames of predominant sound signals $\hat{X}_{PS}(k)$ are empty. The second set of indices $\mathcal{J}_{E}(k-1)$, $\mathcal{J}_{D}(k-1)$, $\mathcal{J}_{U}(k-1)$ of coefficient sequences of the modified ambient HOA component that have to be enabled, disabled and to remain active in the $(k-1)^{th}$ frame are set to zero. The synthesizing 912 the HOA representation of the predominant HOA sound components $\hat{C}_{PS}(k-1)$ from the predominant sound signals $\hat{X}_{PS}(k)$ in the Predominant Sound Synthesis block 606 can therefore be skipped, and the synthesizing 913 an ambient HOA component $\hat{\hat{C}}_{AMB}(k-1)$ from the modified ambient HOA component $\tilde{C}_{I,AMB}(k)$ in the Ambient Synthesis block 607 corresponds to a conventional HOA synthesis.

The original (i.e. monolithic, non-scalable, non-layered) mode for the HOA compression may still be useful for applications where a low quality base layer bit stream is not required, e.g. for file based compression. A major advantage of perceptually coding the spatially transformed first $O_{MIN}$ coefficient sequences of the ambient HOA component $C_{AMB}$, which is a difference between the original and the directional HOA representation, instead of the spatially transformed coefficient sequences of the original HOA component C, is that in the former case the cross correlations between all signals to be perceptually coded are reduced. Any cross correlations between the signals $z_i$, $i=1, \ldots, I$ may cause a constructive superposition of the perceptual coding noise during the spatial decoding process, while at the same time the noise-free HOA coefficient sequences are canceled at superposition. This phenomenon is known as perceptual noise unmasking.

In the layered mode, there are high cross correlations between each of the signals $z_i$, $i=1, \ldots, O_{MIN}$ and also between the signals $z_i$, $i=1, \ldots, O_{MIN}$ and $z_i$, $i=O_{MIN}+1, \ldots, I$, because the modified coefficient sequences of the ambient HOA component $\tilde{c}_{AMB,n}$, $n=1, \ldots, O_{MIN}$ include signals of the directional HOA component (see eq. (3)). To the contrary, this is not the case for the original, non-layered mode. It can therefore be concluded that the transmission robustness introduced by the layered mode may come at the expense of compression quality. However, the reduction in compression quality is low compared to the increase in transmission robustness. As has been shown above, the proposed layered mode is advantageous in at least the situations described above.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

CITED REFERENCES

EP12306569.0

EP12305537.8 (published as EP2665208A)

EP133005558.2

ISO/IEC JTC1/SC29/WG11 N14264. Working draft 1-HOA text of MPEG-H 3D audio, January 2014

The invention claimed is:

1. A method of decoding a compressed Higher Order Ambisonics (HOA) representation of a sound or a soundfield, the method comprising:

receiving a bitstream containing the compressed HOA representation; and determining whether there are multiple layers relating to the compressed HOA representation;

decoding, based on a determination that there are multiple layers, the compressed HOA representation from the bitstream to obtain a sequence of decoded HOA representations, wherein a first subset of the sequence of decoded HOA representations corresponds to a first set of indices and a second subset of the sequence of decoded HOA representations corresponds to a second set of indices, wherein the second subset of the sequence is determined based on an addition of a corresponding ambient sound component and a corresponding predominant sound component.

2. An apparatus for decoding a compressed Higher Order Ambisonics (HOA) representation of a sound or a soundfield, the apparatus comprising:

a receiver for receiving a bitstream containing the compressed HOA presentation; and an audio decoder for decoding, based on a determination that there are multiple layers, the compressed HOA representation from the bitstream to obtain a sequence of decoded HOA representations, wherein a first subset of the sequence of decoded HOA representations corresponds to a first set of indices and a second subset of the sequence of decoded HOA representations corresponds to a second set of indices, wherein the second subset of the sequence is determined based on an addition of a corresponding ambient sound component and a corresponding predominant sound component.

3. A non-transitory computer readable storage medium containing instructions that when executed by a processor perform the method of claim 1.

* * * * *